US008783864B2

(12) United States Patent
Matsui

(10) Patent No.: US 8,783,864 B2
(45) Date of Patent: *Jul. 22, 2014

(54) METHOD FOR MANUFACTURING LENS FOR ELECTRONIC SPECTACLES, LENS FOR ELECTRONIC SPECTACLES, AND ELECTRONIC SPECTACLES

(75) Inventor: Masatomo Matsui, Ehime (JP)

(73) Assignee: Panasonic Healthcare Co., Ltd., Ehime (JP)

( * ) Notice: Subject to any disclaimer, the term of this patent is extended or adjusted under 35 U.S.C. 154(b) by 181 days.

This patent is subject to a terminal disclaimer.

(21) Appl. No.: 13/313,697

(22) Filed: Dec. 7, 2011

(65) Prior Publication Data

US 2012/0075575 A1 Mar. 29, 2012

Related U.S. Application Data

(63) Continuation of application No. 12/809,790, filed as application No. PCT/JP2008/003799 on Dec. 17, 2008, now Pat. No. 8,096,653.

(30) Foreign Application Priority Data

Dec. 21, 2007 (JP) ................... 2007-329719

(51) Int. Cl.
*G02C 7/02* (2006.01)
*G02C 7/08* (2006.01)
(52) U.S. Cl.
CPC ..................... *G02C 7/088* (2013.01)
USPC ..................................... 351/159.39

(58) Field of Classification Search
CPC .................................. G02C 7/02; G02C 7/088
USPC ............................ 351/159.39, 159.4; 345/7, 8
See application file for complete search history.

(56) References Cited

U.S. PATENT DOCUMENTS

| 5,411,792 | A | 5/1995 | Yukinobu et al. |
| 5,777,714 | A * | 7/1998 | Conway ........................... 351/47 |
| 5,835,185 | A | 11/1998 | Kallman et al. |
| 5,995,271 | A | 11/1999 | Zieba et al. |
| 6,404,476 | B1 * | 6/2002 | Mase ............................. 349/149 |
| 7,290,875 | B2 | 11/2007 | Blum et al. |
| 8,096,653 | B2 | 1/2012 | Matsui |
| 2004/0084790 | A1 * | 5/2004 | Blum et al. .................. 264/1.32 |
| 2005/0185135 | A1 | 8/2005 | Blum et al. |
| 2006/0056003 | A1 | 3/2006 | Tonar et al. |
| 2007/0153356 | A1 | 7/2007 | McCabe et al. |
| 2007/0296918 | A1 * | 12/2007 | Blum et al. .................. 351/169 |

(Continued)

FOREIGN PATENT DOCUMENTS

| GB | 2306691 | 5/1997 |
| JP | 54-074546 U | 5/1979 |

(Continued)

*Primary Examiner* — Darryl J Collins
(74) *Attorney, Agent, or Firm* — Hamre, Schumann, Mueller & Larson, P.C.

(57) ABSTRACT

Electronic spectacles include a spectacle frame; lenses having electric elements; a control unit that generates electric signals for driving the electric elements of the lenses; electric connector that transmit the signals from the control unit to wiring connector pads; and the electric connector have one end connected to a control unit for controlling the electric element and an another end extended to the inside of a rim of the spectacle frame. The electric connector passes through rim locks.

8 Claims, 33 Drawing Sheets

(56) References Cited

U.S. PATENT DOCUMENTS

| | | |
|---|---|---|
| 2009/0201461 A1 | 8/2009 | Kosa et al. |
| 2009/0251660 A1 | 10/2009 | Figler et al. |
| 2009/0256977 A1 | 10/2009 | Haddock et al. |
| 2010/0128188 A1 | 5/2010 | Choi et al. |
| 2010/0177277 A1* | 7/2010 | Kokonaski et al. ........... 351/168 |
| 2012/0075576 A1 | 3/2012 | Matsui |
| 2012/0075578 A1 | 3/2012 | Matsui |
| 2012/0081659 A1 | 4/2012 | Matsui |
| 2012/0154741 A1 | 6/2012 | Sone et al. |

FOREIGN PATENT DOCUMENTS

| | | |
|---|---|---|
| JP | 61-177428 | 8/1986 |
| JP | 1-88927 U | 6/1989 |
| JP | 2-30921 U | 2/1990 |
| JP | 02-132210 U | 11/1990 |
| JP | 02-138720 U | 11/1990 |
| JP | 03-005135 U | 1/1991 |
| JP | 03-005136 U | 1/1991 |
| JP | 03-035521 U | 4/1991 |
| JP | 03-045515 U | 4/1991 |
| JP | 3-45515 U | 4/1991 |
| JP | 07-209677 | 8/1995 |
| JP | 2003-152401 | 5/2003 |
| JP | 2005-519684 | 7/2005 |
| JP | 2007-004083 | 1/2007 |
| WO | WO 95/19588 | 7/1995 |
| WO | WO 03/034138 | 4/2003 |
| WO | WO 03/077012 | 9/2003 |

* cited by examiner (a)

(b)

(a)

(b)

(c)

(d)

METHOD FOR MANUFACTURING LENS FOR ELECTRONIC SPECTACLES, LENS FOR ELECTRONIC SPECTACLES, AND ELECTRONIC SPECTACLES

CROSS-REFERENCE TO RELATED APPLICATIONS

This application is a Continuation of application Ser. No. 12/809,790, filed Jun. 21, 2010, which is a U.S. National Stage application of PCT/JP2008/003799 filed Dec. 17, 2008, which applications are incorporated herein by reference.

TECHNICAL FIELD

The present invention relates to electric wiring for an electric element of a lens part in electronic spectacles and proposes a structure capable of particularly improving the reliability of electric connection.

BACKGROUND ART

Electronic spectacles have been proposed in which electric elements such as an electrochromic (EC) element and a liquid crystal element are formed on or in a lens and the function of the lens is changed by supplying electric energy to the electric elements.

For example, electronic spectacles using EC elements are available.

In this example, an electrode wiring method for driving an EC element is shown in FIG. 43 that is a sectional view of a lens. As shown in FIG. 43, an EC element 607 formed on a substrate lens 601 is made up of a lower ITO transparent electrode 602, an $Ir_2O_3/SnO_2$ layer 603, a $Ta_2O_5$ layer 604, a $WO_3$ layer 605, and an upper ITO transparent electrode layer 606. Further, plated layers 608a and 608b of two-layer structures are formed on the outer periphery of the lens (the inclined surfaces of V-blocks) as electrodes for extraction from the electrode layers. The plated layers 608a and 608b are in electrical
contact with the upper ITO transparent electrode layer 606 and the lower ITO transparent electrode layer 602, respectively. As shown in FIG. 44, the frame of the spectacles is made up of metallic upper and lower rims 609a and 609b sharing a current path. The upper and lower rims 609a and 609b are joined via an insulator such as a thin plastic sheet.

A method for joining the lens and the rims and connecting a control unit and the EC element 607 is disclosed in which the electrodes 608a and 608b formed on the outer periphery of the lens and the upper and lower rims 609a and 609b are brought into contact with each other and terminals from the control unit are fastened between rim locks 609a1 on the ends of the upper and lower rims 609a and 609b (e.g., see patent document 1).

Patent document 1: Japanese Utility Model Laid-Open No. 2-138720

DISCLOSURE OF THE INVENTION

Problem to be Solved by the Invention

In the configuration of the prior art, however, the lower ITO transparent electrode 602 and the upper ITO transparent electrode layer 606, which are electrodes provided on the outer periphery of the lens, are electrically connected only through contact with the upper rim 609a and the lower rim 609b that act as rims. Thus the electrical connection may become faulty when, for example, a screw (not shown) for fastening the rim locks 609a1 becomes loose.

In order to prevent the faulty electrical connection, it is necessary to increase the thickness of the ITO transparent electrode layer but a dry process such as vapor deposition cannot increase the thickness of the ITO transparent electrode layer. For this reason, the ITO transparent electrode layer is formed by using a wet process. In the wet process, however, ITO particles dispersed into an ink solvent increase the electrical resistance of the ITO transparent electrode layer, thereby degrading the operating characteristics of the element in the lens.

The present invention has been devised to solve the problem of the prior art. An object of the present invention is to provide electronic spectacles that can increase the reliability of electrical connection to an electronic circuit outside a lens without degrading the operating characteristics of an element in the lens of the electronic spectacles. Another object of the present invention is to provide a method for efficiently manufacturing the lens for electronic spectacles.

Means for Solving the Problem

A method for manufacturing a lens for electronic spectacles according to the present invention, in the fabrication of the lens containing an electric element between a lower substrate and an upper substrate, the method including: fabricating the lower substrate such that a first recess for lens electrode pads is formed on a surface of the lower substrate, the surface being opposed to the upper substrate, the first recess is coated with conductive ink to form a transparent first auxiliary electrode layer, and a transparent lower electrode pattern is formed on the electric element forming part of the lower substrate and the first auxiliary electrode layer by a vapor deposition method so as to connect the electric element forming part and the first auxiliary electrode layer; fabricating the upper substrate such that a second recess for the lens electrode pads is formed on a surface of the upper substrate, the surface being opposed to the lower substrate, the second recess is coated with conductive ink to form a transparent second auxiliary electrode layer, and a transparent upper electrode pattern is formed by the vapor deposition method on a part corresponding to the electric element forming part on the upper substrate and the second auxiliary electrode layer so as to connect the part corresponding to the electric element forming part and the second auxiliary electrode layer; and joining the upper and lower substrates with the electric element interposed between the electric element forming part of the lower substrate and the upper substrate.

A method for manufacturing a lens for electronic spectacles according to the present invention, in the fabrication of the lens containing an electric element between a lower substrate and an upper substrate, the method including: fabricating the lower substrate such that a first recess for lens electrode pads is formed on a surface of the lower substrate, the surface being opposed to the upper substrate, a lower electrode pattern is formed on the electric element forming part of the lower substrate and the first recess so as to connect the electric element forming part and the first recess, and the lower electrode pattern of the first recess is coated with conductive ink to form a transparent first auxiliary electrode layer; fabricating the upper substrate such that a transparent upper electrode pattern is formed by a vapor deposition method on a part corresponding to the electric element forming part on the upper substrate and a second recess for the lens electrode pads so as to connect the part corresponding to the electric element forming part and the second recess, and the upper electrode pattern of the second recess is coated with conductive ink to form a transparent second auxiliary electrode layer; and joining the upper and lower substrates with the electric element interposed between the electric element forming part of the lower substrate and the upper substrate.

The method for manufacturing the lens for electronic spectacles further includes, after joining the upper and lower substrates, cutting the upper and lower substrates at positions on the first and second recesses to expose the cut surfaces of the first and second recesses on a lens end.

The method for manufacturing the lens for electronic spectacles further includes: after joining the upper and lower substrates, cutting the upper and lower substrates at positions on the first and second recesses to expose the cut surfaces of the first and second recesses on a lens end; and forming conductive paste on the exposed first and second recesses to form the lens electrode pad serving as an extraction electrode for the first auxiliary electrode layer and the lower electrode pattern and the lens electrode pad serving as an extraction electrode for the second auxiliary electrode layer and the upper electrode pattern.

A lens for electronic spectacles according to the present invention is a lens containing an electric element between two substrates, wherein a lens electrode pad on one end of an electrode for applying a voltage to the electric element is exposed on a lens end, and the lens electrode pad has the electrode formed in a recess on a bonded surface of one of the two substrates, the electrode being formed by stacking an auxiliary electrode layer formed of conductive ink and a lower electrode pattern formed by a vapor deposition method.

The recess is exposed on the lens end as a curved surface.

A method for manufacturing a lens for electronic spectacles according to the present invention, in the fabrication of the lens containing an electric element between a lower substrate and an upper substrate, the method including: fabricating the lower substrate such that a surface of the lower substrate is coated with conductive ink to form a transparent first auxiliary electrode layer for lens electrode pads, the surface being opposed to the upper substrate, and a transparent lower electrode pattern is formed by a vapor deposition method on the electric element forming part of the lower substrate and the first auxiliary electrode layer so as to connect the electric element forming part and the first auxiliary electrode layer; fabricating the upper substrate such that a surface of the upper substrate is coated with the conductive ink to form a transparent second auxiliary electrode layer for the lens electrode pads, the surface being opposed to the lower substrate, and a transparent upper electrode pattern is formed by the vapor deposition method on a part corresponding to the electric element forming part on the upper substrate and the second auxiliary electrode layer so as to connect the part corresponding to the electric element forming part and the second auxiliary electrode layer; and joining the upper and lower substrates with the electric element interposed between the electric element forming part of the lower substrate and the upper substrate.

A method for manufacturing a lens for electronic spectacles according to the present invention, in the fabrication of the lens containing an electric element between a lower substrate and an upper substrate, the method including: fabricating the lower substrate such that a transparent lower electrode pattern for applying a signal to the electric element forming part of the lower substrate is formed by a vapor deposition method, and one end of the lower electrode pattern is coated with conductive ink to form a transparent first auxiliary electrode layer; fabricating the upper substrate such that a transparent upper electrode pattern is formed by the vapor deposition method, the upper electrode pattern applying a signal to a part corresponding to the electric element forming part on the upper substrate, and one end of the upper electrode pattern is coated with conductive ink to form a transparent second auxiliary electrode layer; and joining the upper and lower substrates with the electric element interposed between the electric element forming part of the lower substrate and the upper substrate.

The method for manufacturing the lens for electronic spectacles further includes, after joining the upper and lower substrates, cutting the upper and lower substrates at positions on the overlap portion of the first auxiliary electrode layer and the lower electrode pattern and the overlap portion of the second auxiliary electrode layer and the upper electrode pattern to expose the cut surfaces of the substrates.

The method for manufacturing the lens for electronic spectacles further includes: after joining the upper and lower substrates, cutting the upper and lower substrates at positions on the overlap portion of the first auxiliary electrode layer and the lower electrode pattern and the overlap portion of the second auxiliary electrode layer and the upper electrode pattern to expose the cut surfaces of the substrates; and forming conductive paste on the overlap portion of the first auxiliary electrode layer and the lower electrode pattern and the overlap portion of the second auxiliary electrode layer and the upper electrode pattern to form the lens electrode pad serving as an extraction electrode for the first auxiliary electrode layer and the lower electrode pattern and the lens electrode pad serving as an extraction electrode for the second auxiliary electrode layer and the upper electrode pattern.

A lens for electronic spectacles according to the present invention is a lens containing an electric element between two substrates, wherein an electrode for applying a voltage to the electric element has one end exposed on a lens end, and the one end of the electrode is formed by stacking an auxiliary electrode layer formed of conductive ink and a lower electrode pattern formed by a vapor deposition method.

A method for manufacturing a lens for electronic spectacles according to the present invention, in the fabrication of the lens containing an electric element between a lower substrate and an upper substrate, the method including: fabricating the lower substrate such that a transparent lower electrode pattern for applying a signal to the electric element forming part of the lower substrate is formed by a vapor deposition method, a lower insulating layer pattern is formed on the electric element forming part and the lower electrode pattern of the lower substrate except for a part to be coated with a first auxiliary electrode layer, and the hole of the lower insulating layer pattern is coated with conductive ink to form the transparent first auxiliary electrode layer; fabricating the upper substrate such that a transparent upper electrode pattern is formed by the vapor deposition method, the upper electrode pattern applying a signal to a part corresponding to the electric element forming part on the upper substrate, an upper insulating layer pattern is formed on the part corresponding to the electric element forming part on the upper substrate and on the upper electrode pattern except for a part to be coated with a second auxiliary electrode layer, and the hole of the upper insulating layer pattern is coated with conductive ink to form the transparent second auxiliary electrode layer; and joining the upper and lower substrates with the electric element interposed between the electric element forming part of the lower substrate and the upper substrate.

A method for manufacturing a lens for electronic spectacles according to the present invention, in the fabrication of the lens containing an electric element between a lower substrate and an upper substrate, the method including: fabricating the lower substrate such that a first recess for lens electrode pads is formed on a surface of the lower substrate, the surface being opposed to the upper substrate, a lower electrode pattern is formed on the electric element forming part of the lower substrate and the first recess so as to connect the electric element forming part and the first recess, a lower insulating layer pattern is formed on the electric element forming part and the lower electrode pattern of the lower substrate except for a part to be coated with a first auxiliary electrode layer, and the hole of the lower insulating layer pattern is coated with conductive ink to form the transparent first auxiliary electrode layer; fabricating the upper substrate such that a transparent upper electrode pattern is formed by a vapor deposition method on a part corresponding to the electric element forming part on the upper substrate and a second recess for the lens electrode pads so as to connect the part corresponding to the electric element forming part and the second recess, an upper insulating layer pattern is formed on the upper electrode pattern and the part corresponding to the electric element forming part on the upper substrate, except for a part to be coated with a second auxiliary electrode layer, and the hole of the upper insulating layer pattern is coated with conductive ink to form the transparent second auxiliary electrode layer; and joining the upper and lower substrates with the electric element interposed between the electric element forming part of the lower substrate and the upper substrate.

Further, electronic spectacles of the present invention are electronic spectacles in which a lens containing an electric element is set in a spectacle frame, the lens having lens electrode pads exposed on the lens end, the lens electrode pads being disposed on one end of an electrode for applying a voltage to the electric element, the spectacle frame including an electric connector having one end connected to a control unit for controlling the electric element, the electric connector having wiring electrode pads disposed on the other end of the electric connector so as to correspond to the positions of the lens electrode pads of the lens, the electronic spectacles having anisotropic conductive rubber interposed between the wiring electrode pad of the electric connector and the lens electrode pad of the lens.

The electronic spectacles further include a rim-side spot facing in the rim of the spectacle frame, the electric connector being placed in the rim-side spot facing; and a lens-side spot facing on the lens end of the lens, the anisotropic conductive rubber being placed in the lens-side spot facing.

Further, the electric connector passes through the rim locks of the spectacle frame and is provided in the rim, and the wiring electrode pads are set inside the rim of the spectacle frame.

Advantage of the Invention

With this configuration, a lens for electronic spectacles has lens electrode pads exposed on a lens end and an electrode formed by stacking an auxiliary electrode layer formed of ITO ink and a lower electrode pattern obtained by ITO sputtering. Thus the electrode of an electrode pattern can have a relatively small volume resistivity and a high light transmittance can be achieved without making the electrode pattern undesirably noticeable.

Further, a spectacle frame has an electric connector on which wiring electric pads are disposed at positions corresponding to the lens electrode pads of the lens, and anisotropic conductive rubber is interposed between the wiring electrode pads and the lens electrode pads. Thus it is possible to prevent disconnection caused by the loosening of a lens fastening part or a displacement of electric wiring and prevent electrical problems such as a short circuit caused by an electric leak.

BEST MODE FOR CARRYING OUT THE INVENTION

The following will specifically describe embodiments of electronic spectacles of the present invention in accordance with the accompanying drawings.

First Embodiment

Figure 5:
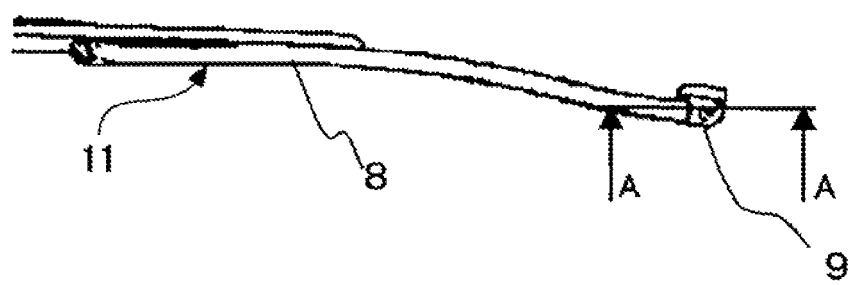
FIG. 5 shows a top view of the electronic spectacles and an enlarged view from a user.
Figure 5:
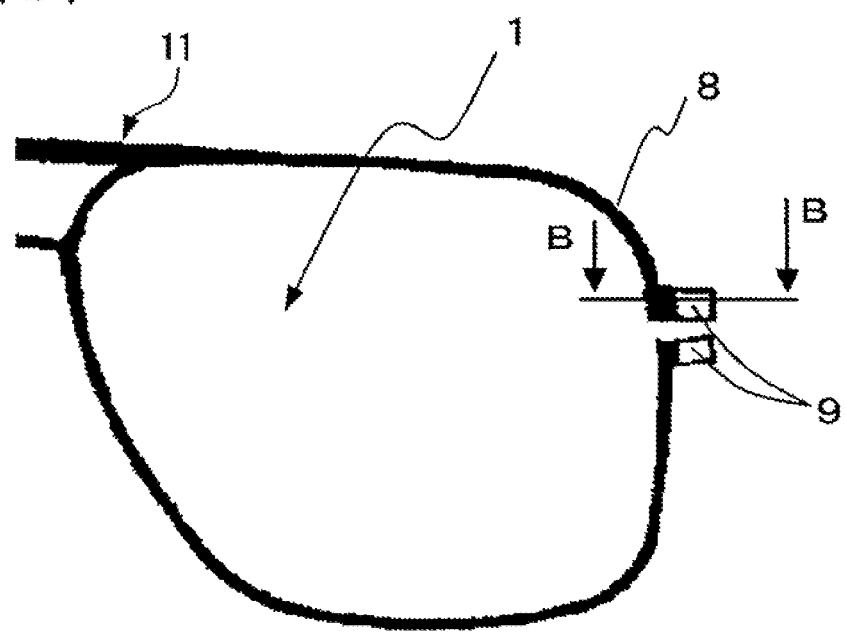

FIGS. 5(a) and 5(b) show electronic spectacles.

Figure 1:
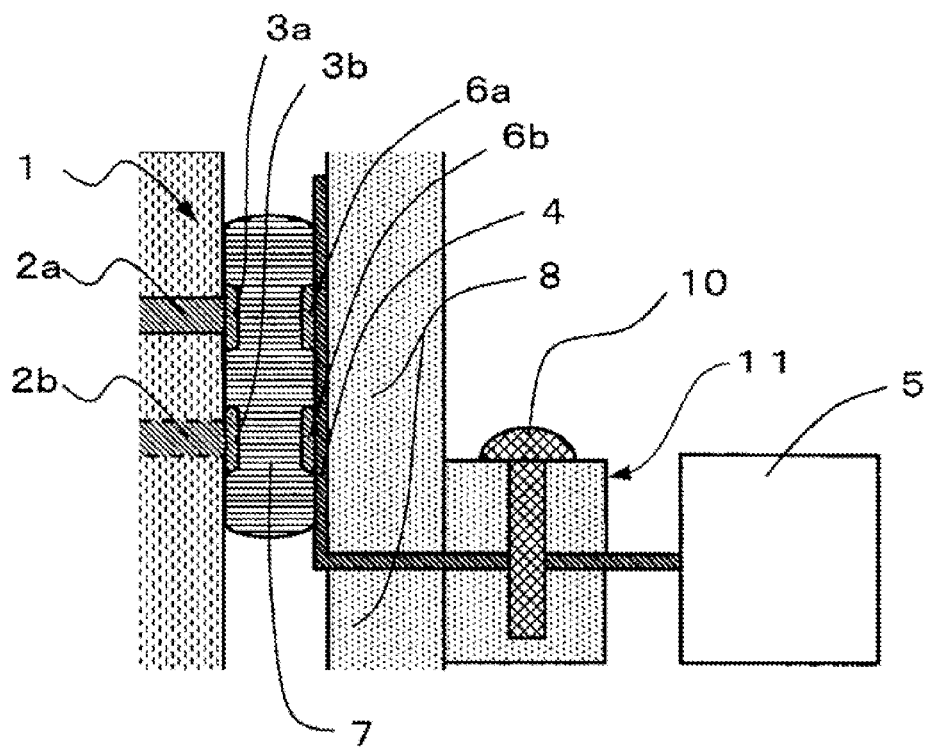
FIG. 1 is an enlarged view of the principle part of electronic spectacles according to a first embodiment of the present invention.

FIG. 1 is a sectional view taken along line A-A of FIG. 5(a) and a sectional view of the joints of lens electrode pads and wiring electrode pads according to a first embodiment of the present invention.

Figure 2:
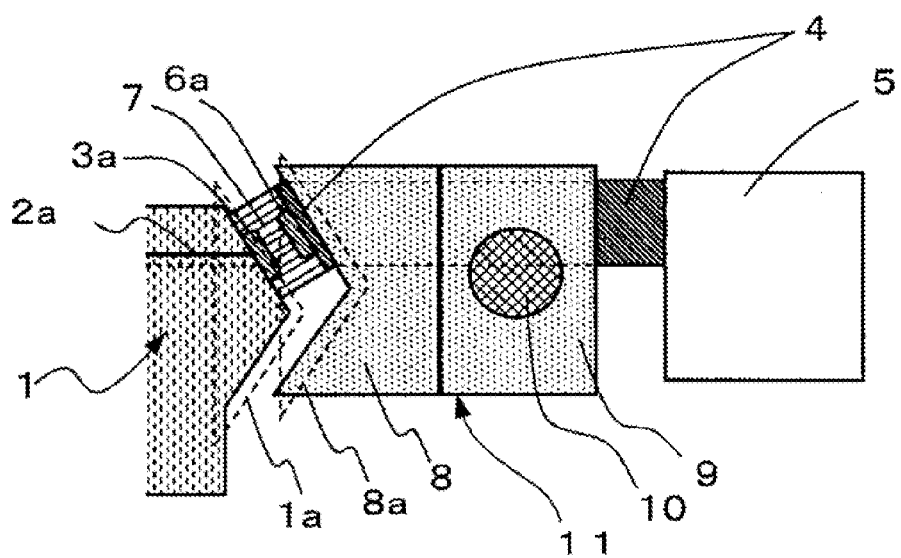
FIG. 2 is an enlarged view of the principle part of the electronic spectacles according to the first embodiment.

FIG. 2 is a sectional view taken along line B-B of FIG. 5(b) and an image of the joint of the lens electrode pad and the wiring electrode pad.

The electronic spectacles of the present invention include a spectacle frame 11; a lens 1 that has an electric element (not shown) such as a liquid crystal and an electrochromic element and is set in a rim 8 of the spectacle frame 11; a control unit 5 that is provided beside the spectacle frame 11 and generates an electric signal for driving the electric element of the lens 1; an electric connector 4 that is provided beside the spectacle frame 11 and transmits a signal from the control unit 5; anisotropic conductive rubber 7 sandwiched between the lens 1 and the rim 8; and a screw 10 for fastening upper and lower rim locks 9 of the rim 8.

The lens 1 is fit into a groove 8a formed inside the rim 8. The lens 1 has electrode patterns 2a and 2b for transmitting the electric signal to the electric element and lens electrode pads 3a and 3b that are formed on a V-block 1a to increase the contact areas of the electrode patterns 2a and 2b on the ends of the electrode patterns 2a and 2b.

On one end of the electric connector 4 beside the spectacle frame 11, electrode pads 6a and 6b are formed so as to be electrically connected to the lens electrode pads 3a and 3b via the anisotropic conductive rubber 7.

The electrode patterns 2a and 2b are formed of extremely thin transparent electrodes such as ITO electrodes and are exposed to the outside on the V-block 1a provided on the outer sidewall of the lens 1. The electrode patterns 2a and 2b are only about 10 nm to 40 nm in thickness and are exposed to the outside as extremely thin lines of about 10 nm to 40 nm. Thus the electrode patterns 2a and 2b may be in poor electric contact with the anisotropic conductive rubber 7. For this reason, in the first embodiment, silver paste and nanoparticles are used for the electrode patterns 2a and 2b exposed to the outside of the lens 1 and the lens electrode pads 3a and 3b are formed on a plane of the V-block 1a to expand an electrode part.

In this case, the electrode patterns 2a and 2b are spaced only several μm apart in the thickness direction of the lens, the spacing being substantially equal to the thickness of the electric element. In order to form the lens electrode pads 3a and 3b respectively on the electrode patterns 2a and 2b, it is necessary to prevent the electrode patterns 2a and 2b on the end of the lens from overlapping each other in the thickness direction of the lens.

The electric signal generated from the control unit 5 made up of a power supply and an IC (integrated circuit) is transmitted to the wiring electrode pads 6a and 6b, which are shaped like the lens electrode pads 3a and 3b, through the electric connector 4 such as a flexible substrate, and then the electric signal is transmitted to the lens electrode pads 3a and 3b through the anisotropic conductive rubber 7.

The anisotropic conductive rubber 7 provided between the lens electrode pads 3a and 3b and the wiring electrode pads 6a and 6b is typical anisotropic conductive rubber that has a side wall surface coated with a rubber material such as silicone. The shape of the anisotropic conductive rubber 7 is set such that the anisotropic conductive rubber 7 serving as an elastic body is sufficiently compressed (deformed) in contact with the exposed surface of a conducting part when the rim locks 9 are fastened by the screw 10 to attach the lens.

Thus even when the screw 10 fastening the rim locks 9 becomes somewhat loose, the electronic spectacles configured thus can be used without electrical disconnection because the anisotropic conductive rubber 7 is elastically deformed.

Further, the lens electrode pads 3a and 3b and the wiring electrode pads 6a and 6b can be sealed by the compressive deformation of the anisotropic conductive rubber 7, so that the electronic spectacles can be used even in the rain without causing short circuits.

Second Embodiment

As shown in FIG. 2, an inverted-V protrusion called the V-block 1a is formed on the outer periphery of the lens 1 and the V-groove 8a is formed on the inner periphery of the rim 8 provided beside the spectacle frame 11.

In the most typical method, the lens 1 is attached to the spectacle frame by fixing the V-block 1a and the groove 8a in engagement with each other. In this configuration, however, the screw 10 fastening the rim locks 9 applies a force diagonally to the anisotropic conductive rubber 7 and the electric connector 4, so that the anisotropic conductive rubber 7 and the electric connector 4 may be displaced from the predetermined positions and result in poor assembly (fitting of the lens) and electrical connection.

Figure 3:
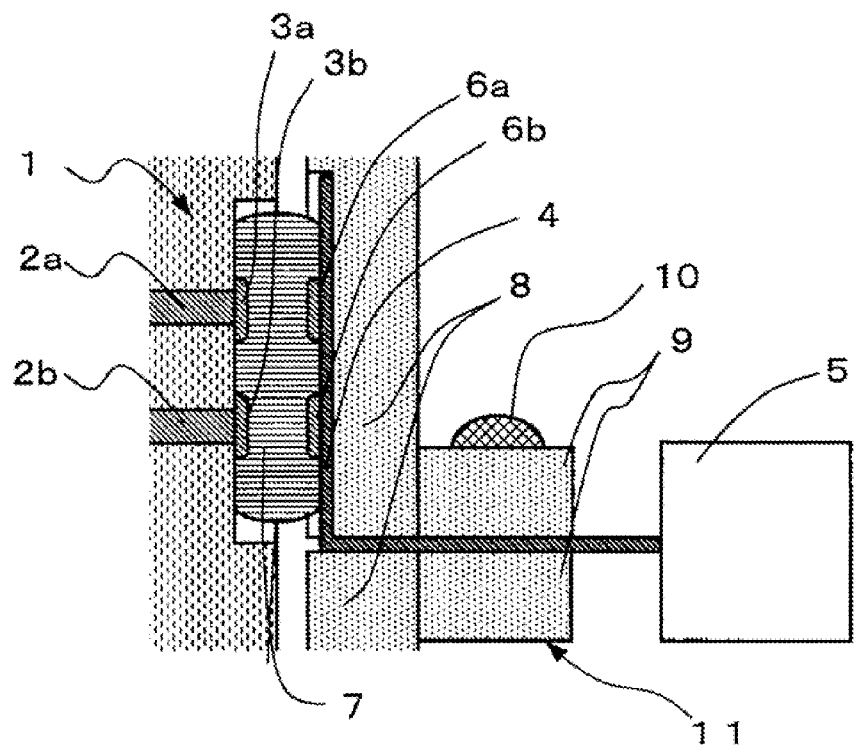
FIG. 3 is an enlarged view showing the principle part of electronic spectacles in which spot facings are formed according to a second embodiment of the present invention.
Figure 4:
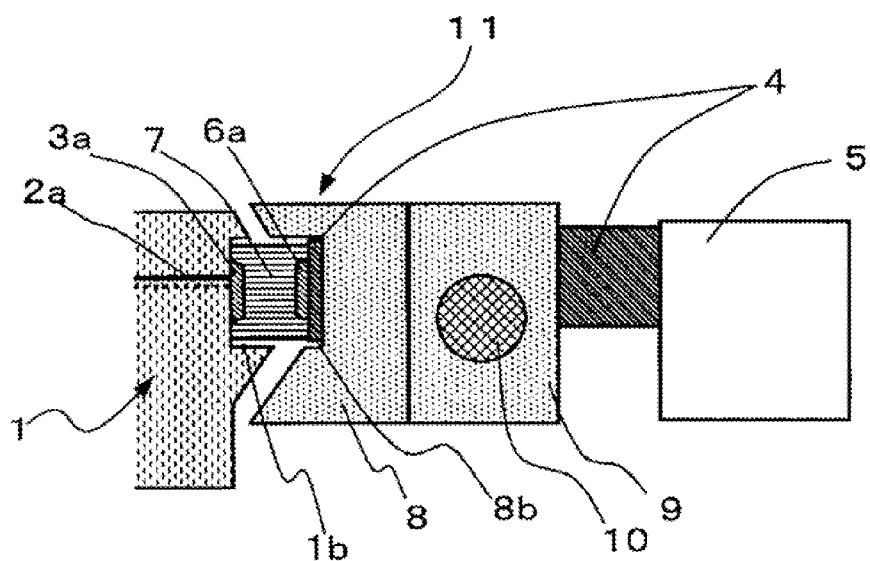
FIG. 4 is an enlarged view showing the principle part of the electronic spectacles in which spot facings are formed according to the second embodiment.

A second embodiment configured as shown in FIGS. 3 and 4 has improved in that a force is not diagonally applied to an anisotropic conductive rubber 7 and an electric connector 4 during assembly.

FIG. 3 is an image of a sectional view showing the joints of the lens electrode pads and wiring electrode pads of electronic spectacles and FIG. 3 is equivalent to a sectional view taken along line A-A of FIG. 5(a) in which the electronic spectacles are viewed from the top. FIG. 4 is an image showing the joints of the lens electrode pads and the wiring electrode pads of the electronic spectacles and FIG. 4 is equivalent to a sectional view taken along line B-B of FIG. 5(b) in which the electronic spectacles are viewed from the front.

As shown in FIGS. 3 and 4, a lens-side spot facing 1b for the anisotropic conductive rubber 7 is formed around lens electrode pads 3a and 3b on a lens 1. Further, on a spectacle frame 11, a rim-side spot facing 8b is formed on a part where an electric connector 4 is set inside a rim 8.

The anisotropic conductive rubber 7 and the electric connector 4 are set thus in the spot facings 1b and 8b, respectively. Thus even a screw 10 fastening rim locks 9 hardly displaces the anisotropic conductive rubber 7 and the electric connector 4, so that it is possible to stably assemble the electronic spectacles and prevent disconnection caused by a displacement of electric wiring.

To be specific, the lens-side spot facing 1b and the rim-side spot facing 8b are formed such that a load is applied perpendicularly to the bottoms of the lens-side spot facing 1b and the rim-side spot facing 8b when the rim locks 9 are fastened by the screw 10. This configuration makes it possible to stably assembly the electronic spectacles and prevent disconnection caused by a displacement of the electric wiring.

In the foregoing embodiments, one end of the electric connector 4 may be connected to the control unit 5 and the wiring electrode pads 6a and 6b on the other end of the electric connector 4 may be set in the groove 8a of the rim 8 so as to be opposed to the lens electrode pads 3a and 3b. For example, the electric connector 4 can be set around the rim locks 9 and the rim 8.

In this example, as shown in FIGS. 1, 2, 3, and 4, the electric connector 4 is passed between the rim locks 9 and is placed in the groove 8a or the spot facing 8b inside the rim 8 to further stabilize the electric connection. Since the electric connector 4 is set between the rim locks, it is possible to prevent a displacement of the electric connector 4 during assembly and make the electric connector 4 undetachable.

To be specific, the electric connector 4 may be fixed between the rim locks 9 or grooves for the electric connector 4 may be formed on the rim locks 9. Moreover, a positioning pin for the electric connector 4 may be provided in the rim locks 9 or the screw 10 may be used as a positioning pin. When grooves are formed, the groove patterns of the formed grooves may be used as positioning patterns, thereby preventing the electric connector 4 from being displaced or detached.

The electric connector 4 set between the rim locks 9 can achieve additional effect on appearance because the electric connector 4 is not exposed to the outside and does not interfere with the design of the spectacles.

In the present embodiment, the position of the control unit 5 is not limited as long as the control unit 5 is fixed inside a temple constituting the spectacles or at a lug on the spectacles. By setting the control unit 5 near the rim locks, the electric connector 4 can be shortened in length.

Third Embodiment

FIGS. 6 to 19 show a method for manufacturing a lens 1 for electronic spectacles.

Figure 6:
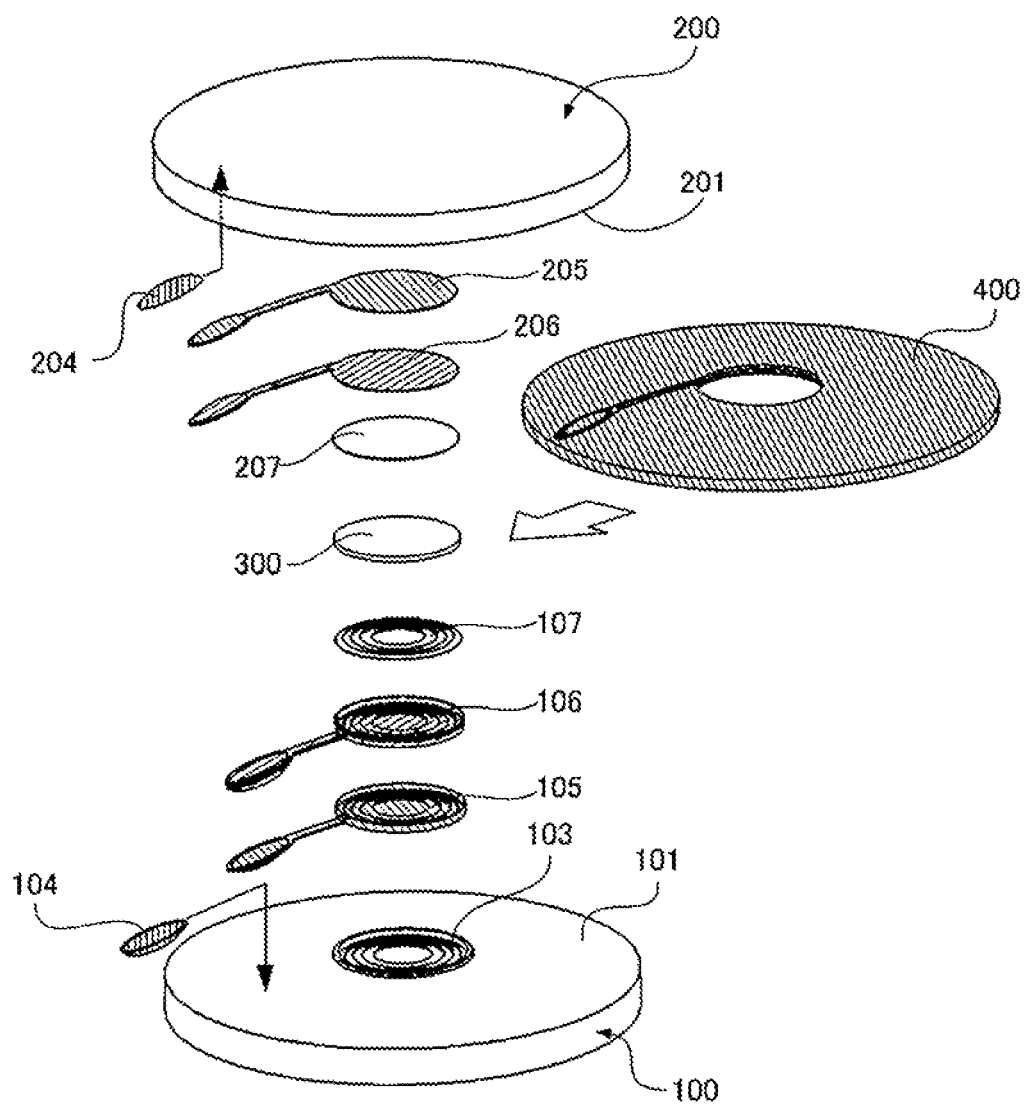
FIG. 6 is an exploded image of a completed lens 1 according to a third embodiment of the present invention.

FIG. 6 shows an exploded image of the completed lens 1 for better understanding of the manufacturing process. The lens 1 contains a liquid crystal 300 serving as an electric element between a lower substrate 100 and an upper substrate 200. Reference numeral 400 denotes an adhesive layer for joining the lower substrate 100 and the upper substrate 200.

Figure 7:
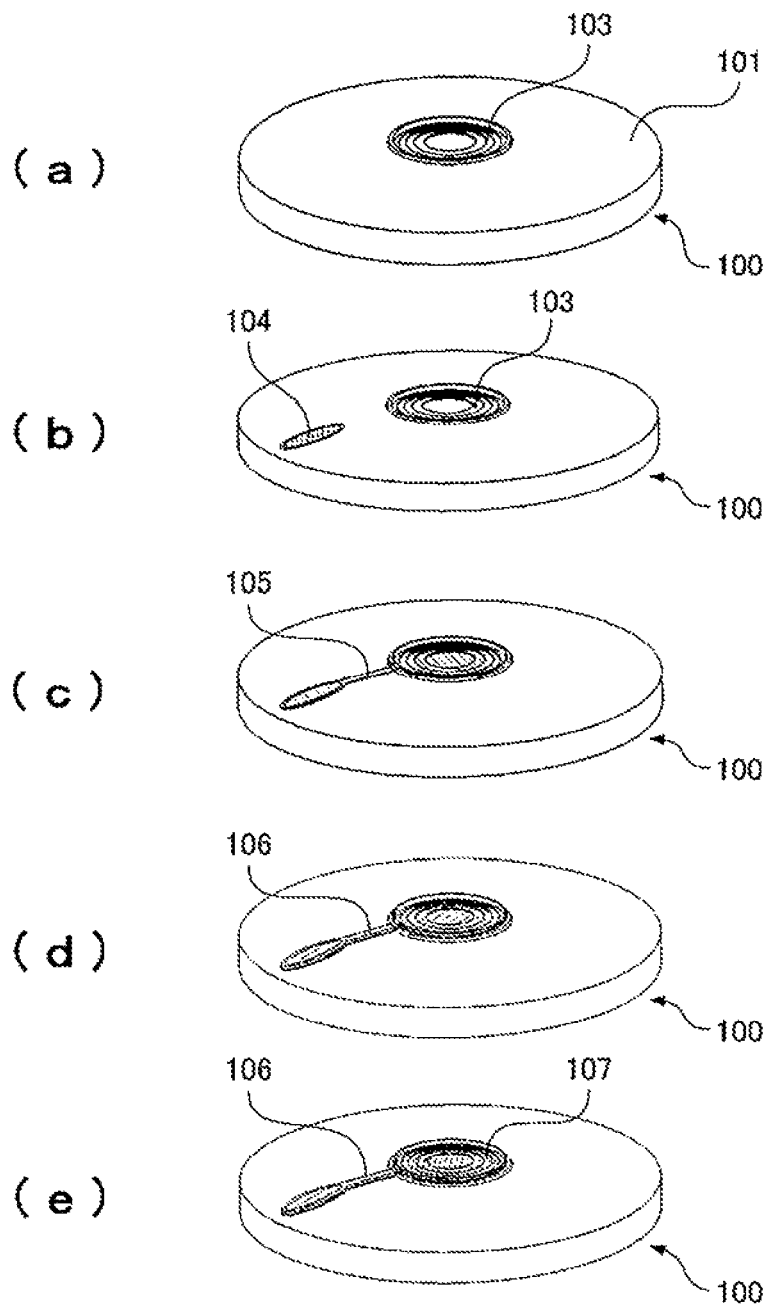
FIG. 7 is a perspective view showing a process of fabricating a lower substrate according to the third embodiment.
Figure 8:
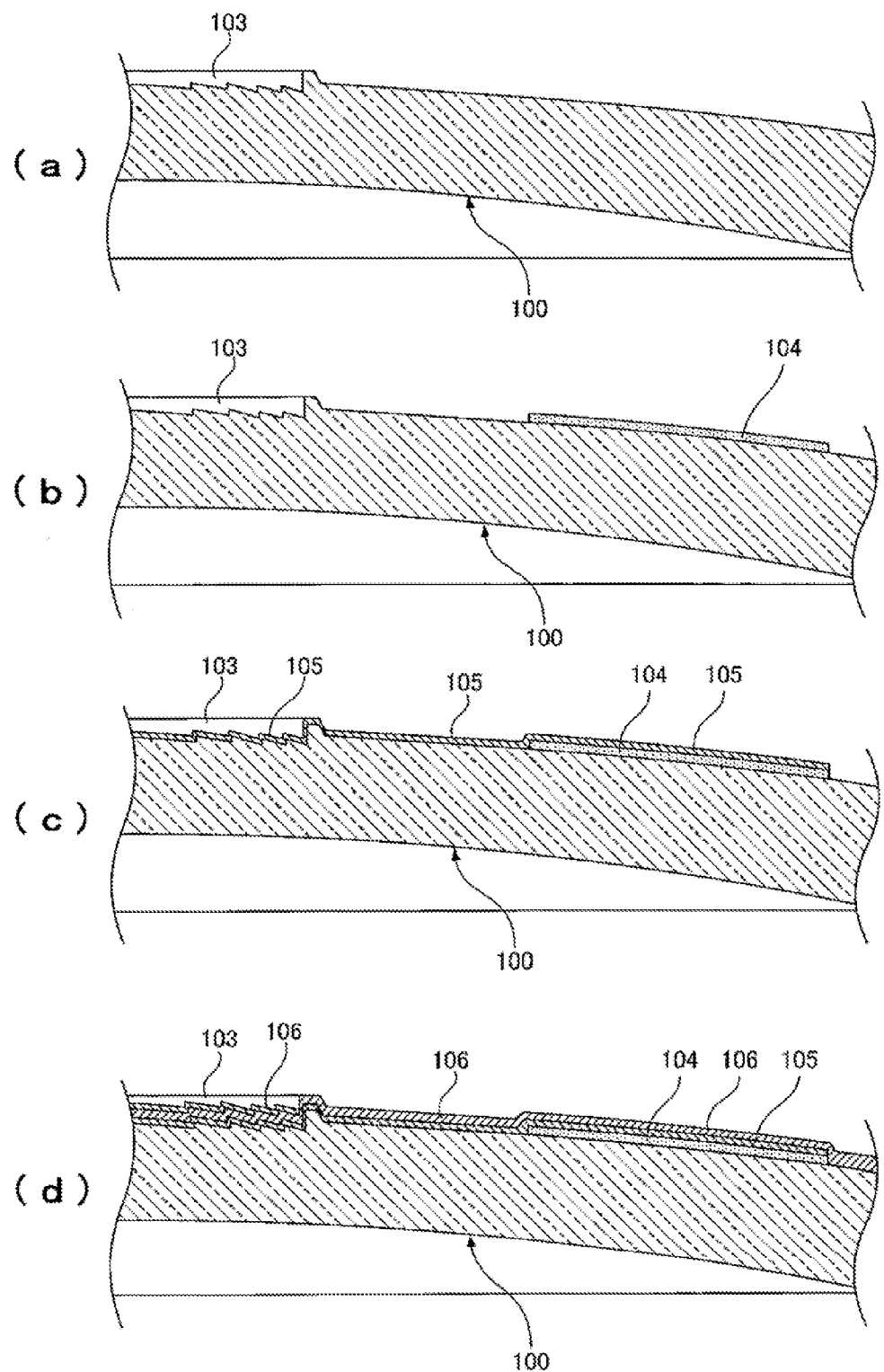
FIG. 8 is a sectional view showing the process of fabricating the lower substrate according to the third embodiment.

FIGS. 7 and 8 show a process for fabricating the lower substrate 100.

In FIG. 7(a), an electric element forming part 103 is formed on a surface 101 of the lower substrate 100 as shown in FIG. 8(a). The surface 101 is opposed to the upper substrate 200 and the liquid crystal 300 is placed later on the electric element forming part 103.

In FIG. 7(b), the lower substrate 100 having a smooth surface is partially coated with conductive ink to form a first auxiliary electrode layer 104 as shown in FIG. 8(b). To be specific, ITO ink that is conductive ink is used. Regarding the physical property of the ITO ink, the ITO ink containing dispersed conductive particles has a large volume resistivity of about $2.4 \times 10^0$ $\Omega \cdot$cm as compared with a conductive film formed by ITO sputtering with a volume resistivity of about 6 to $2 \times 10^{-4}$ $\Omega \cdot$cm, whereas an ITO ink film formed with a thickness of 1 μm has a spectral transmittance substantially equal to the spectral transmittance of an ITO conductive film formed by sputtering with a thickness of 30 nm. Therefore, the conductive film of the ITO ink is more transparent than the ITO conductive film formed by sputtering, on the assumption that films are equal in thickness. The ITO ink can obtain a transmittance of about 80% even when the film is 1 μm in thickness. The ITO ink may be applied by an ink-jet method or a dispenser. Further, the ITO ink can be applied also by spin coating or dipping at a necessary point on the lower substrate 100 masked with tape and the like. The first auxiliary electrode layer 104 formed of the ITO ink is preferably at least 1 μm in thickness.

In FIG. 7(c), a lower electrode pattern 105 is formed on the electric element forming part 103 and the first auxiliary electrode layer 104 so as to connect the electric element forming part 103 and the first auxiliary electrode layer 104 as shown in FIG. 8(c). To be specific, ITO sputtering is performed using a mask pattern connecting the electric element forming part 103 and the first auxiliary electrode layer 104. The lower electrode pattern 105 is about 10 nm to 40 nm in thickness.

In FIG. 7(d), a lower insulating layer pattern 106 is formed on the electric element forming part 103 and the lower electrode pattern 105 as shown in FIG. 8(d). To be specific, after ITO sputtering in FIG. 7(c), $SiO_2$ is continuously sputtered without removing the lower substrate 100 from a chamber (without exposing the lower substrate 100 to the atmosphere). Such sputtering can be performed by a sputtering apparatus having multiple targets in a single chamber and thus a special apparatus is not necessary.

In FIG. 7(e), an alignment layer 107 is applied to a part to be coated with the liquid crystal 300, and rubbing is performed thereon.

Figure 9:
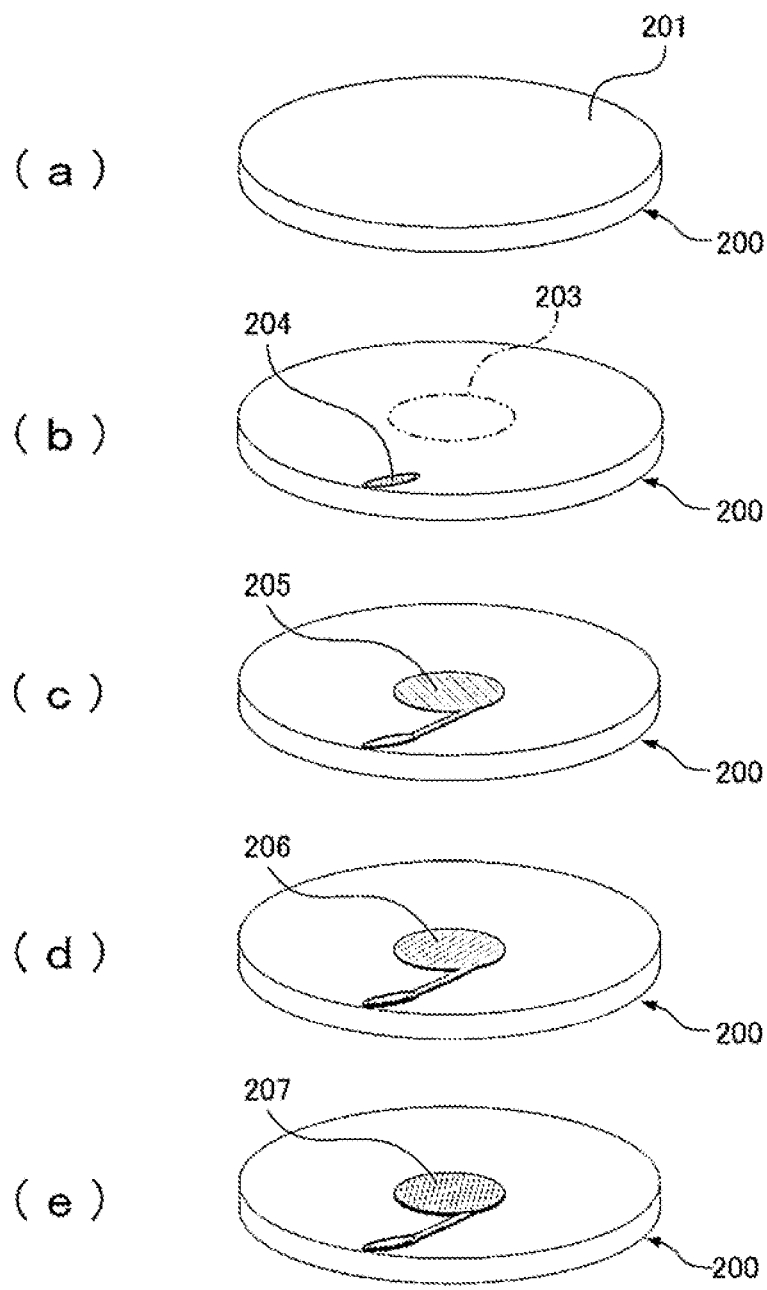
FIG. 9 is a perspective view showing a process of fabricating an upper substrate according to the third embodiment.
Figure 10:
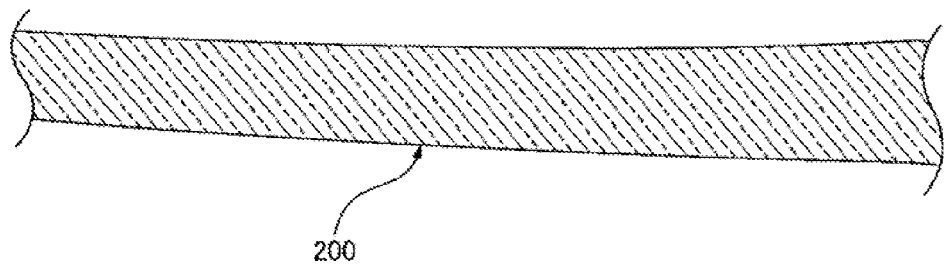
FIG. 10 is a sectional view showing the process of fabricating the upper substrate according to the third embodiment.
Figure 10:
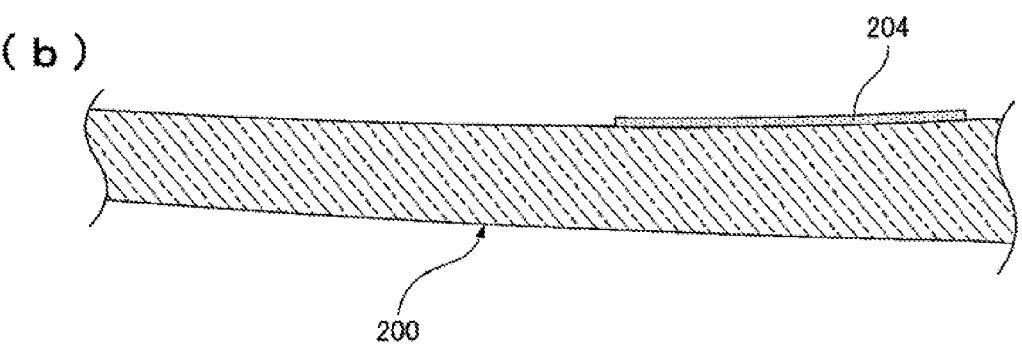
Figure 10:
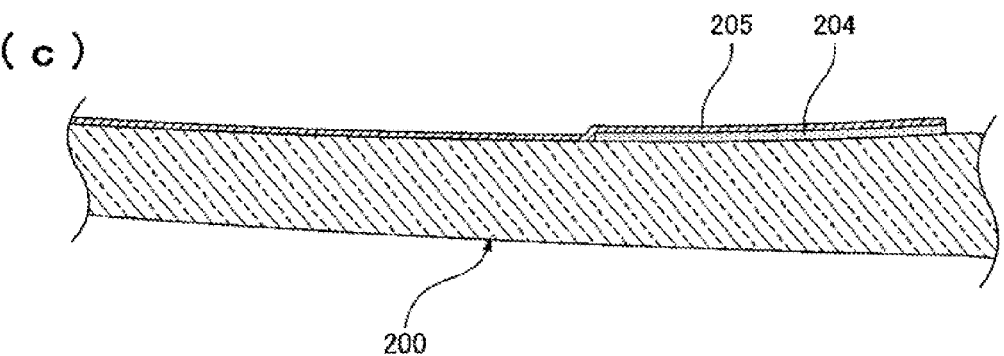
Figure 10:
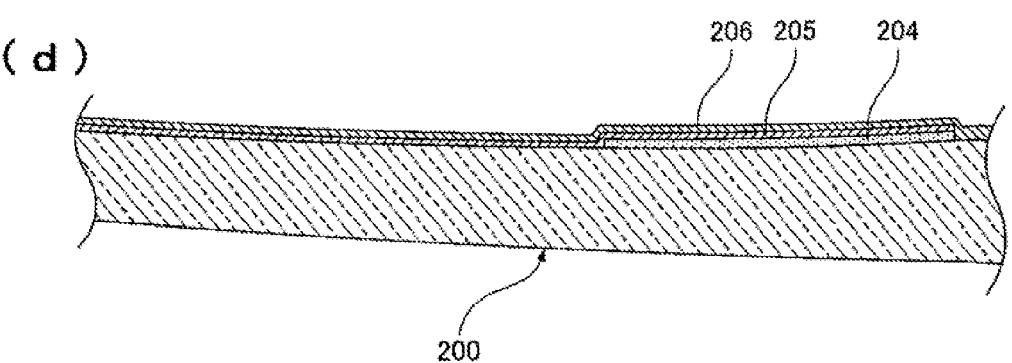

FIGS. 9 and 10 show a process for fabricating the upper substrate 200.

The upper substrate 200 having a smooth surface as shown in FIG. 9(a) is coated with conductive ink as shown in FIG. 10(b), so that a second auxiliary electrode layer 204 is formed as shown in FIG. 9(b). The conductive ink may be applied by an ink-jet method or a dispenser. Further, the conductive ink can be applied by spin coating or dipping at a necessary point on the upper substrate 200 masked with tape and the like. The second auxiliary electrode layer 204 is preferably at least 1 μm in thickness.

In FIG. 9(c), an upper electrode pattern 205 is formed on a part 203 and the second auxiliary electrode layer 204 so as to connect the part 203 and the second auxiliary electrode layer 204 as shown in FIG. 10(c). The part 203 corresponds to the electric element forming part 103 on the lower substrate 100. To be specific, ITO sputtering is performed using a mask pattern connecting the part 203 and the second auxiliary electrode layer 204. The upper electrode pattern 205 is about 10 nm to 40 nm in thickness.

In FIG. 9(d), an upper insulating layer pattern 206 is formed on the upper electrode pattern 205 as shown in FIG. 10(d). To be specific, after ITO sputtering in FIG. 9(c), $SiO_2$ is continuously sputtered without removing the upper substrate 200 from a chamber device (without exposing the upper substrate 200 to the atmosphere). Such sputtering can be performed by a sputtering apparatus having multiple targets in a single chamber and thus a special apparatus is not necessary.

In FIG. 9(e), an alignment layer 207 is applied onto the upper electrode pattern 205 so as to correspond to the part 203 and rubbing is performed thereon. The lower substrate 100 and the upper substrate 200 are bonded with an adhesive layer 400 in a state in which the liquid crystal 300 serving as the electric element is interposed between the electric element forming part 103 of the lower substrate 100 fabricated thus and the upper substrate 200. To be specific, the liquid crystal 300 is applied by a dispenser or the ink-jet method. After the liquid crystal 300 is applied, an adhesive (sealing agent) is applied around the liquid crystal 300 and then the lower substrate 100 and the upper substrate 200 are bonded with the adhesive layer 400.

Figure 11:
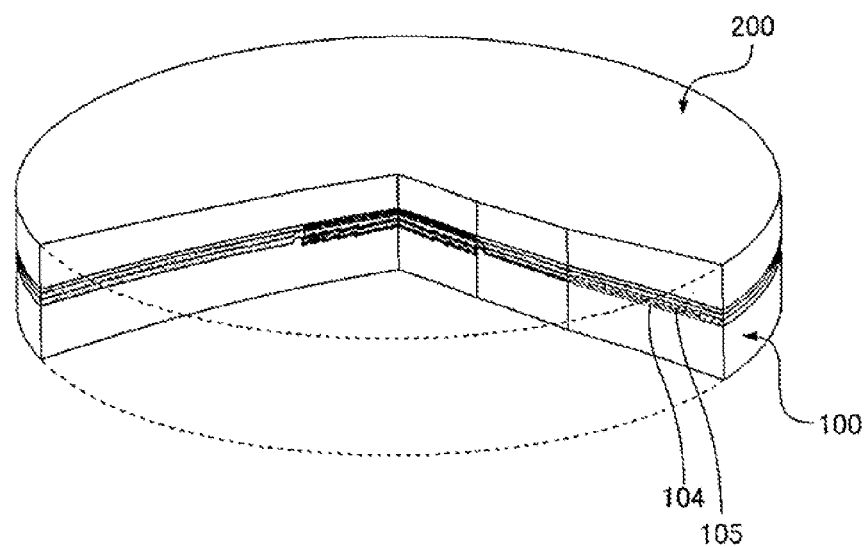
FIG. 11 is an enlarged perspective view in which a lens of the third embodiment is cut at a position on a first auxiliary electrode layer 104.
Figure 12:
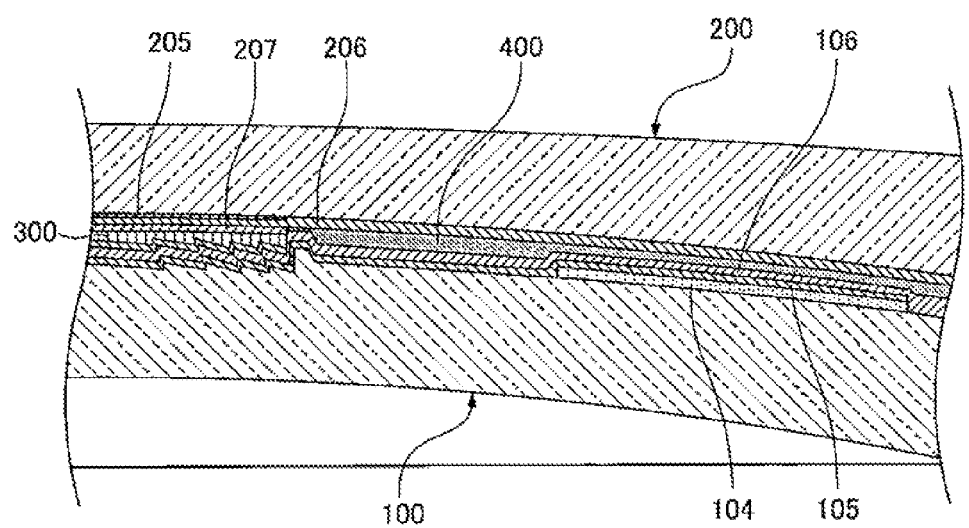
FIG. 12 is a sectional view in which the lens of the third embodiment is cut at the position on the first auxiliary electrode layer 104.
Figure 13:
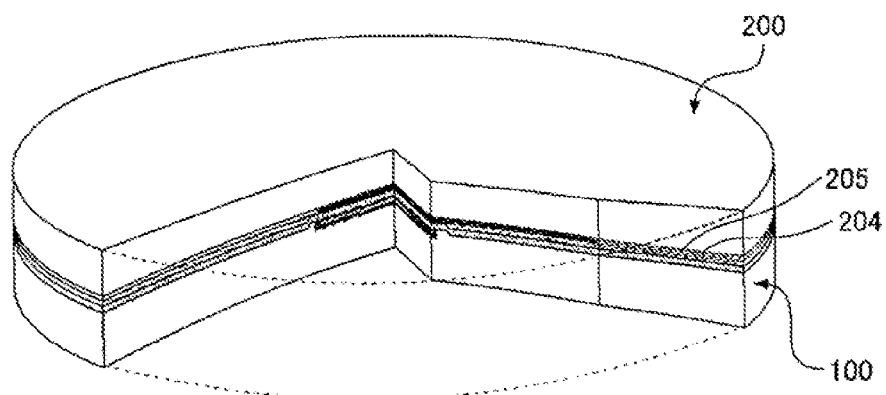
FIG. 13 is an enlarged perspective view in which the lens of the third embodiment is cut at a position on a second auxiliary electrode layer 204.
Figure 14:
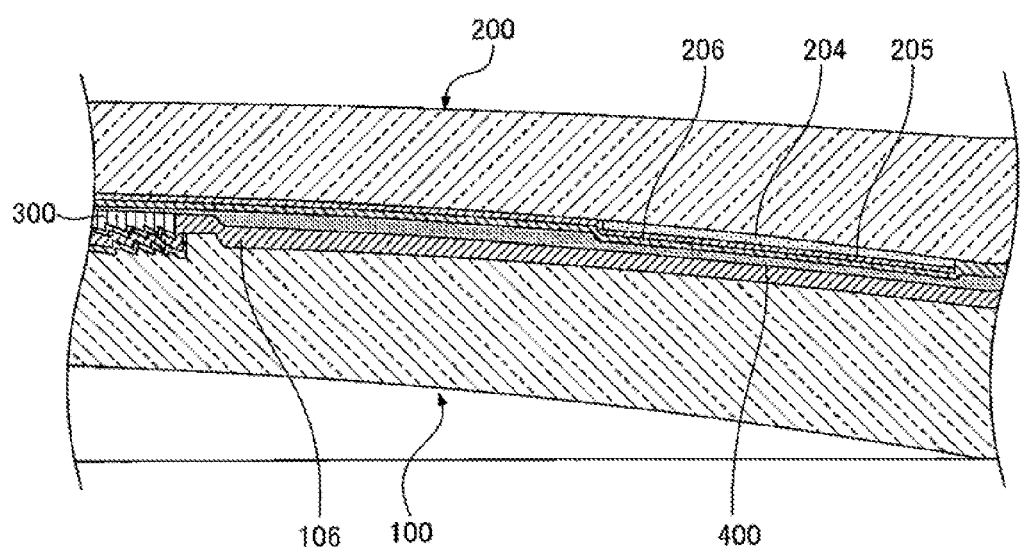
FIG. 14 is a sectional view in which the lens of the third embodiment is cut at the position on the second auxiliary electrode layer 204.

FIG. 11 is an enlarged perspective view in which the bonded lower substrate 100 and upper substrate 200 are cut at a position on the first auxiliary electrode layer 104. FIG. 12 is an enlarged view of the principle part of FIG. 11. FIG. 13 is an enlarged perspective view in which the bonded lower substrate 100 and upper substrate 200 are cut at a position on the second auxiliary electrode layer 204. FIG. 14 is an enlarged view of the principle part of FIG. 13.

Figure 15:
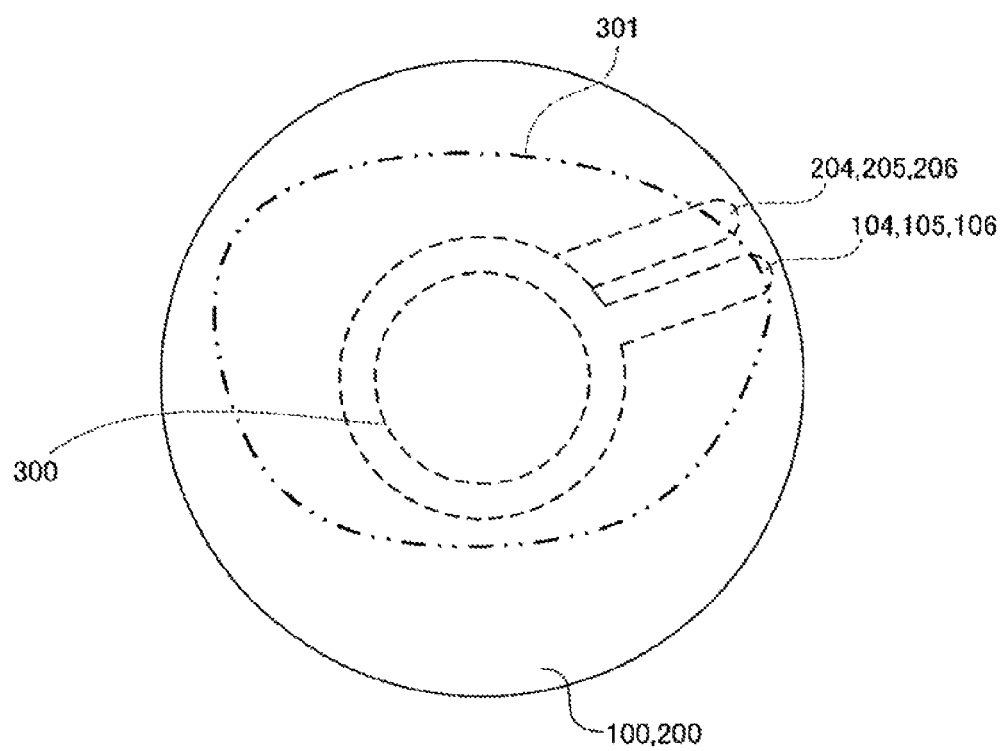
FIG. 15 is a plan view showing the cutting position of the lens according to the third embodiment.
Figure 16:
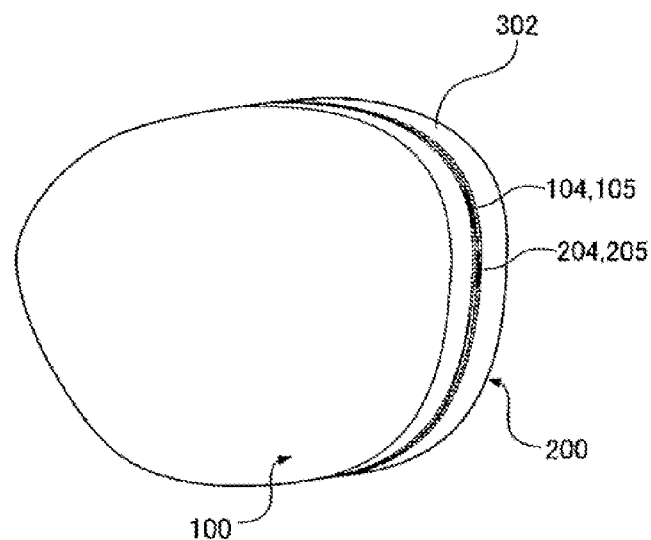
FIG. 16 is an enlarged perspective view showing a lens end face of the cut lens according to the third embodiment.
Figure 17:
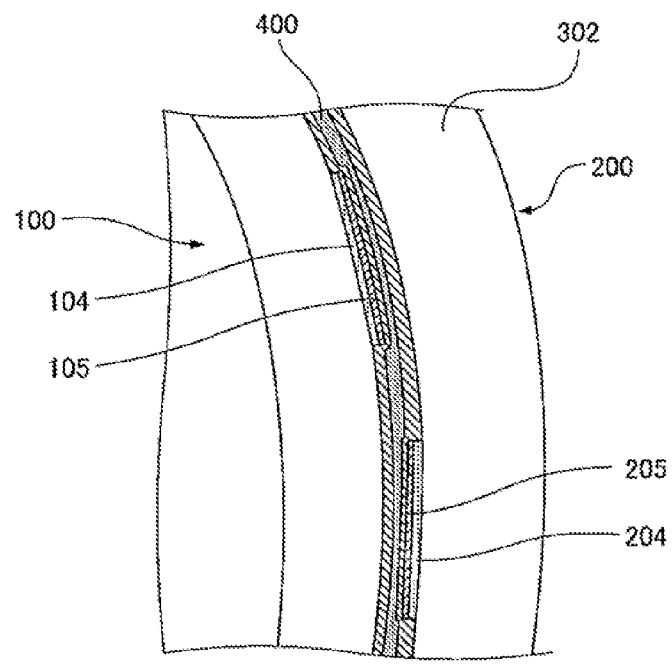
FIG. 17 is an enlarged view showing the principle part of the third embodiment.

As shown in FIG. 15, the lower substrate 100 and the upper substrate 200 that have been bonded thus are cut along a cutting line 301 according to the shape of the rim of the spectacle frame 11. The cutting line 301 passes through the end of the first auxiliary electrode layer 104 and the end of the second auxiliary electrode layer 204. Since the substrates are cut thus, as shown in FIG. 16, the end face of the overlap portion of the first auxiliary electrode layer 104 and the lower electrode pattern 105 and the end face of the overlap portion of the second auxiliary electrode layer 204 and the upper electrode pattern 205 are exposed on a lens end 302. As shown in FIG. 17, the end faces of the first auxiliary electrode layer 104 and the lower electrode pattern 105 are exposed on the lower substrate 100 and the end faces of the second auxiliary electrode layer 204 and the upper electrode pattern 205 are exposed on the upper substrate 200.

Figure 18:
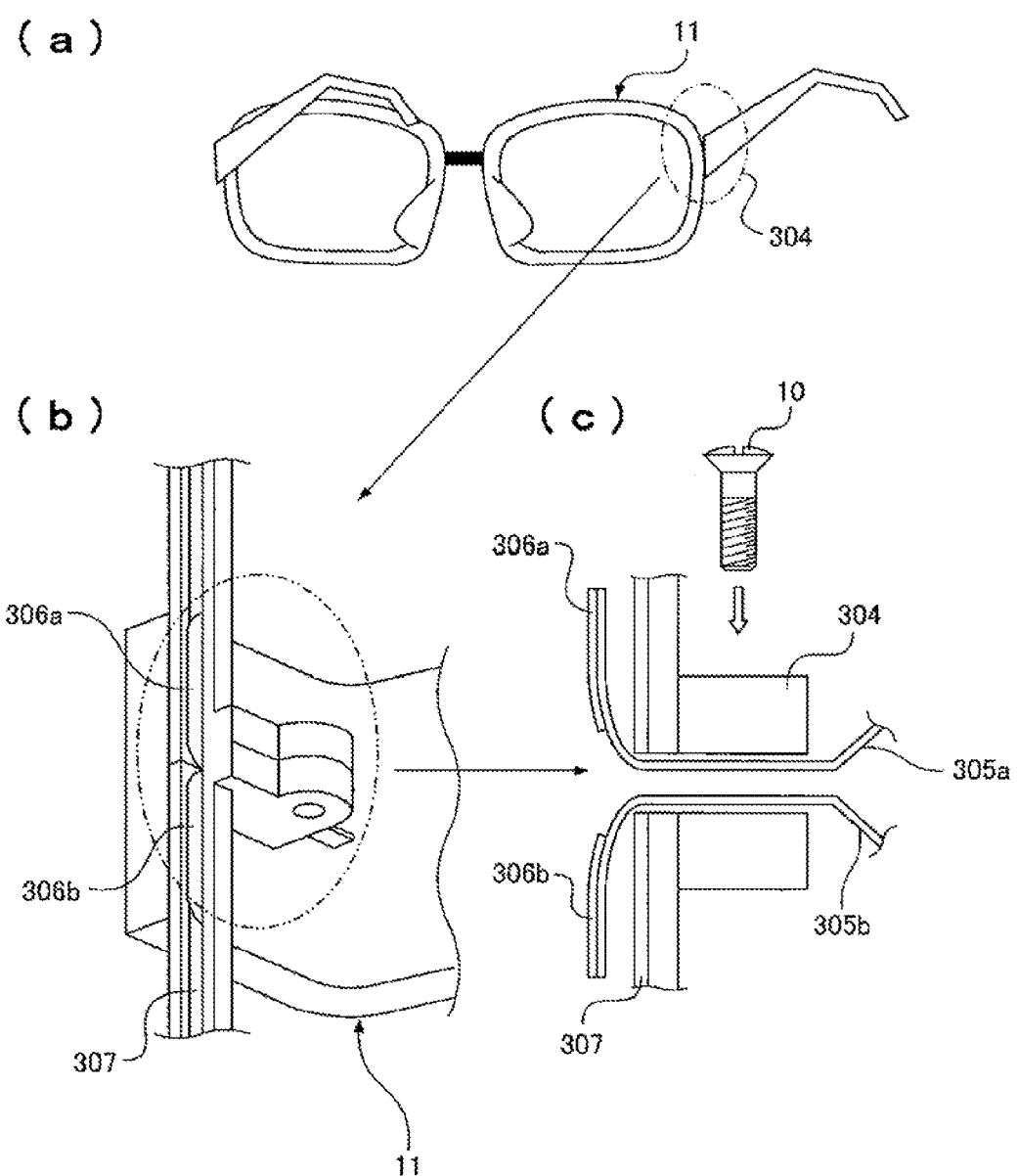
FIG. 18 shows a schematic view of a spectacle frame and an enlarged perspective view and a structural diagram of a lug of the spectacle frame according to the third embodiment.
Figure 19:
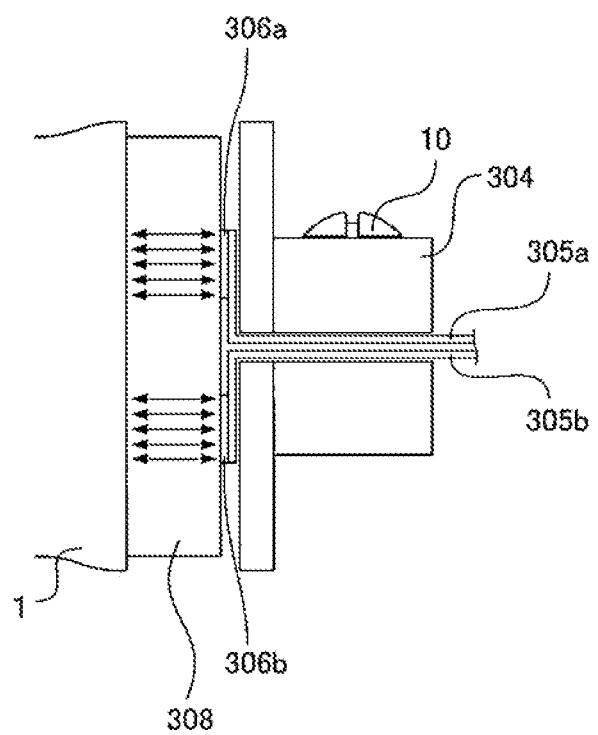
FIG. 19 is a structural diagram showing that the lens is set in the spectacle frame according to the third embodiment.

As shown in FIGS. 18 and 19, the electronic spectacles can be constructed using the lens of FIG. 16. The lenses 1 are set in the spectacle frame 11.

As shown in FIG. 18(a), flexible wires 305a and 305b serving as an electric connector 4 are provided at a lug 304 of the spectacle frame 11. The flexible wires 305a and 305b have one ends connected to the control unit 5 and wiring electrode pads 306a and 306b are formed on the other ends of the flexible wires 305a and 305b. As shown in FIG. 18(b), the wiring electrode pads 306a and 306b are set in a rim 307 of the spectacle frame 11.

When the lens 1 is set in the rim 307, anisotropic conductive rubber 308 is disposed as shown in FIG. 19 between the wiring electrode pads 306a and 306b and the first auxiliary electrode layer 104, the lower electrode pattern 105, the second auxiliary electrode layer 204, and the upper electrode pattern 205 of the lens 1. In this state, the lens 1 is supported by the rim 307 with a screw 10, so that the wiring electrode pad 306a is electrically connected to the lower electrode pattern 105 of the lens in a reliable manner via the anisotropic conductive rubber 308. Further, the wiring electrode pad 306b is electrically connected to the upper electrode pattern 205 of the lens in a reliable manner via the anisotropic conductive rubber 308. This is because the first auxiliary electrode layer 104 formed on the lower electrode pattern 105 increases a contact area with the anisotropic conductive rubber 308 and improves electrical continuity. The second auxiliary electrode layer 204 has the same effect. With this configuration, a voltage for driving the liquid crystal 300 can be applied between the lower electrode pattern 105 and the upper electrode pattern 205 of the lens 1 from the control unit 5.

In the case where the lower electrode pattern 105 is increased in thickness and the first auxiliary electrode layer 104 is not provided or in the case where the upper electrode pattern 205 is increased in thickness and the second auxiliary electrode layer 204 is not provided, as compared with the present embodiment, the resistance of the electrode can be reduced but light transmittance decreases without the first and second auxiliary electrode layers 104 and 204. The light transmittance is an important factor of the electronic spectacles. Consequently, the lower electrode pattern 105 and the upper electrode pattern 205 can be easily visible in an undesirably noticeable manner. In contrast to this configuration, in the third embodiment, the lower electrode pattern 105 is reduced in thickness and the first auxiliary electrode layer 104 is stacked thereon to increase the overall thickness. Further, the upper electrode pattern 205 is reduced in thickness and the second auxiliary electrode layer 204 is stacked thereon to increase the overall thickness. Thus the electrode can have a relatively low resistance and the lower electrode pattern 105 and the upper electrode pattern 205 are not noticeable. For this reason, the laminated structure of the first and second auxiliary electrode layers 104 and 204 is quite effective.

In the case where the lower substrate 100 and the upper substrate 200 are coated with the first and second auxiliary electrode layers 104 and 204 and then the lower electrode pattern 105 and the upper electrode pattern 205 are formed thereon, the lower insulating layer pattern 106 and the upper insulating layer pattern 206 can be formed, as previously mentioned, on the lower electrode pattern 105 and the upper electrode pattern 205 by continuous sputtering without removing the lower substrate 100 and the upper substrate 200 by opening the chamber to the atmosphere.

To be specific, in the case where the lower electrode pattern 105 and the upper electrode pattern 205 are formed on the lower substrate 100 and the upper substrate 200 and then the first and second auxiliary electrode layers 104 and 204 are applied thereon, it is necessary to form the lower insulating layer pattern 106 and the upper insulating layer pattern 206 after forming the lower electrode pattern 105 and the upper electrode pattern 205 by sputtering, opening the sputtering apparatus to the atmosphere to remove the lower substrate 100 and the upper substrate 200, and then changing the mask pattern. Thus vapor drawing performed twice in the sputtering apparatus results in a complicated fabrication process.

In the third embodiment, the first and second auxiliary electrode layers 104 and 204 are first formed on the lower substrate 100 and the upper substrate 200. In this case, the lower electrode pattern 105 and the lower insulating layer pattern 106 can be formed on the lower substrate 100 without opening the sputtering apparatus to the atmosphere, and the upper electrode pattern 205 and the upper insulating layer pattern 206 can be formed on the upper substrate 200 without opening the sputtering apparatus to the atmosphere, thereby achieving a simple fabrication process.

Figure 20:
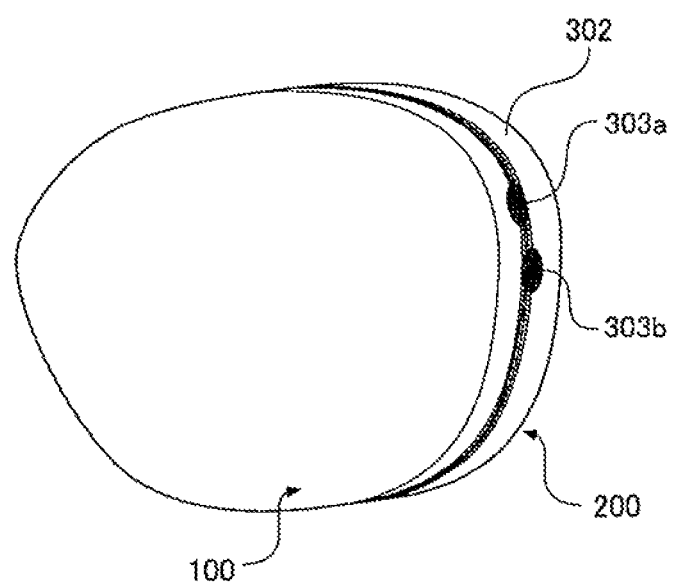
FIG. 20 is an enlarged perspective view of another example in which silver paste is applied to a lens end face of the lens according to the third embodiment.
Figure 21:
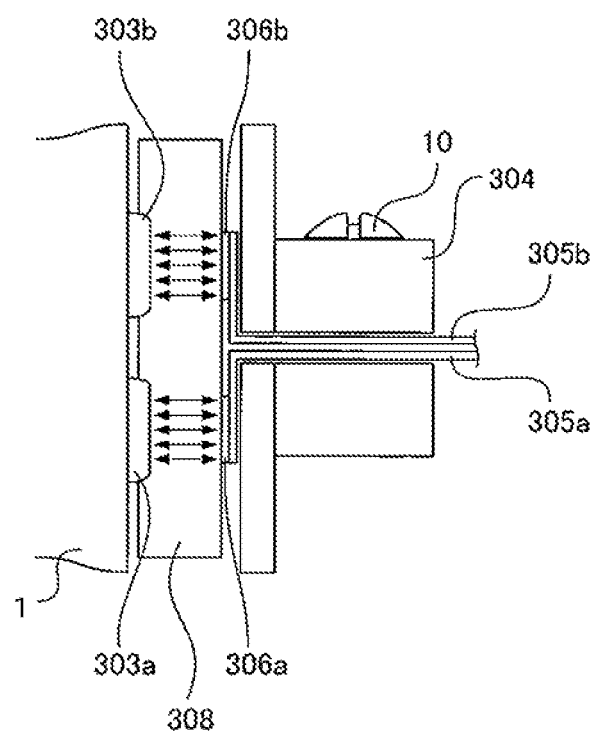
FIG. 21 is a structural diagram showing another example in which the lens is set in the spectacle frame according to the third embodiment.

As shown in FIGS. 20 and 21, it is more preferable to apply conductive paste on the first auxiliary electrode layer 104 and the second auxiliary electrode layer 204 because the conductive paste increases the contact area. To be specific, as shown in FIG. 20, silver pastes 303a and 303b are respectively applied as conductive pastes to the exposed end face of the overlap portion of the first auxiliary electrode layer 104 and the lower electrode pattern 105 and the end face of the overlap portion of the second auxiliary electrode layer 204 and the upper electrode pattern 205. Ideally, the silver paste 303a formed on the lens end 302 is electrically connected to the first auxiliary electrode layer 104 as well as the lower electrode pattern 105. In the present embodiment, the thin lower electrode pattern 105 is exposed on the lens end 302 and the first auxiliary electrode layer 104 having a larger thickness than the lower electrode pattern 105 is also exposed on the lens end 302. Thus even when the lower electrode pattern 105 is insufficiently exposed on the lens end 302, the silver paste 303a can be electrically connected to the lower electrode pattern 105 in a reliable manner via the thick first auxiliary electrode layer 104.

Similarly, it is ideal that the silver paste 303b formed on the lens end 302 is electrically connected to the second auxiliary electrode layer 204 as well as the upper electrode pattern 205. In the present embodiment, the thin upper electrode pattern 205 is exposed on the lens end 302 and the second auxiliary electrode layer 204 having a larger thickness than the upper electrode pattern 205 is also exposed on the lens end 302. Thus even when the upper electrode pattern 205 is insufficiently exposed on the lens end 302, the silver paste 303b can be electrically connected to the upper electrode pattern 205 in a reliable manner via the thick second auxiliary electrode layer 204.

Fourth Embodiment

FIGS. 22 to 25 show a fourth embodiment of the present invention.

In the third embodiment, the lower substrate 100 is coated with the first auxiliary electrode layer 104 and then the lower electrode pattern 105 is formed thereon, and the upper substrate 200 is coated with the second auxiliary electrode layer 204 and then the upper electrode pattern 205 is formed thereon. The fourth embodiment is different only in that first and second auxiliary electrode layers 104 and 204 are applied later and other points are similar to those of the third embodiment.

Figure 22:
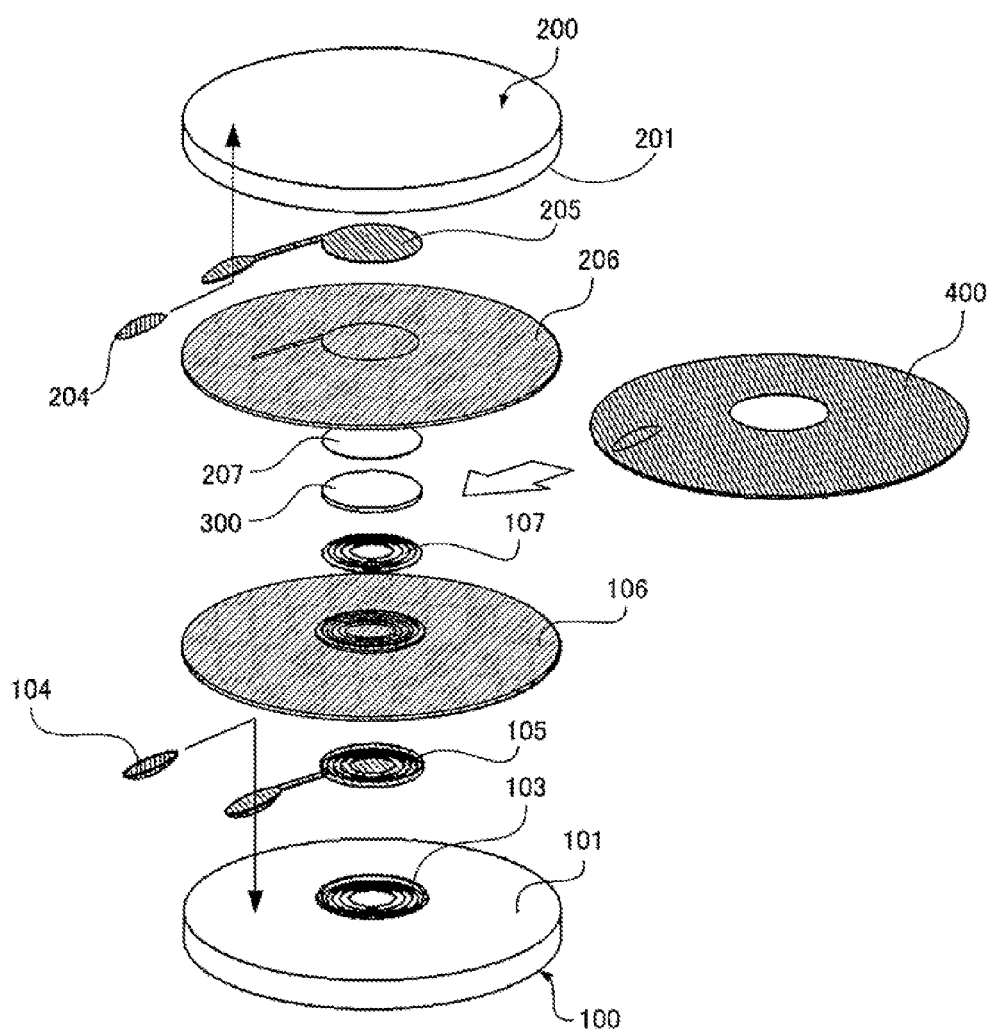
FIG. 22 is an exploded image of a completed lens 1 according to a fourth embodiment of the present invention.
Figure 23:
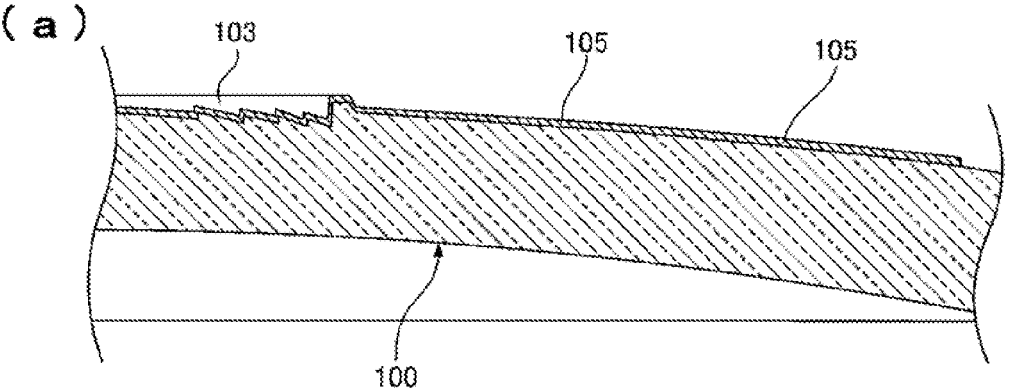
FIG. 23 is a sectional view showing a process of fabricating a lower substrate according to the fourth embodiment.
Figure 23:
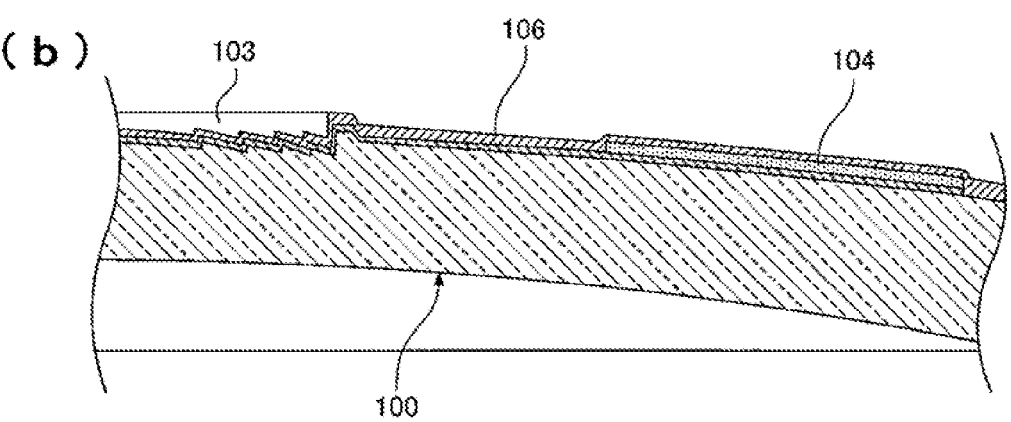
Figure 23:
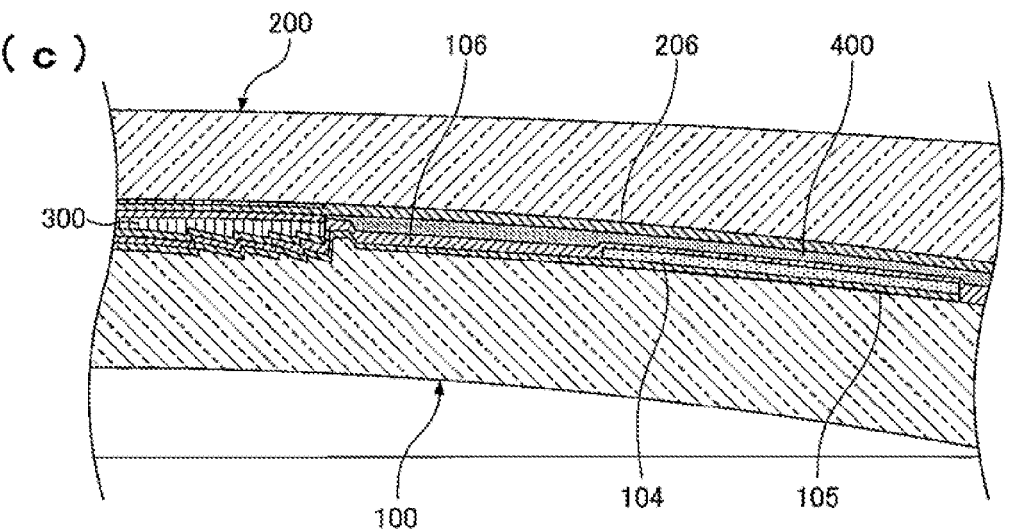

FIG. 22 shows an exploded image of a completed lens 1 for better understanding of the manufacturing process.

In FIG. 23(a), a lower electrode pattern 105 is formed from an electric element forming part 103 of a lower substrate 100 to a part near the outer periphery of the lower substrate 100.

In FIG. 23(b), only one end of the lower electrode pattern 105 is coated with conductive ink to form the first auxiliary electrode layer 104. After that, a lower insulating layer pattern 106 is formed on the electric element forming part 103 and the first auxiliary electrode layer 104 from the lower electrode pattern 105. Further, as shown in FIG. 22, an alignment layer 107 is formed on the lower insulating layer pattern 106 so as to correspond to the position of the electric element forming part 103.

Also in this case, an upper substrate 200 is formed as in FIGS. 23(a) and 23(b). In other words, as shown in FIG. 22, an upper electrode pattern 205 is formed from a part corresponding to the electric element forming part 103 on the lower substrate 100 to a part near the outer periphery of the upper substrate 200, and the upper electrode pattern 205 is coated with conductive ink only near the outer periphery of the upper substrate 200 to form the second auxiliary electrode layer 204. Moreover, an upper insulating layer pattern 206 is formed on the upper electrode pattern 205 and an alignment layer 207 is formed thereon.

Figure 24:
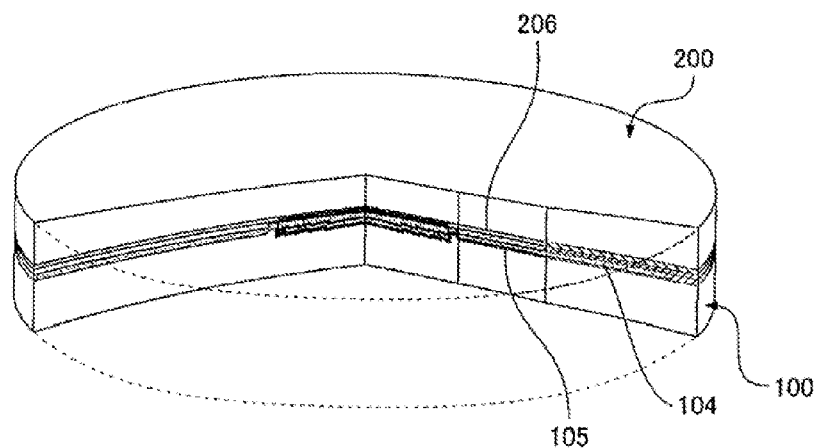
FIG. 24 is an enlarged perspective view in which a lens of the fourth embodiment is cut at a position on a first auxiliary electrode layer 104.
Figure 25:
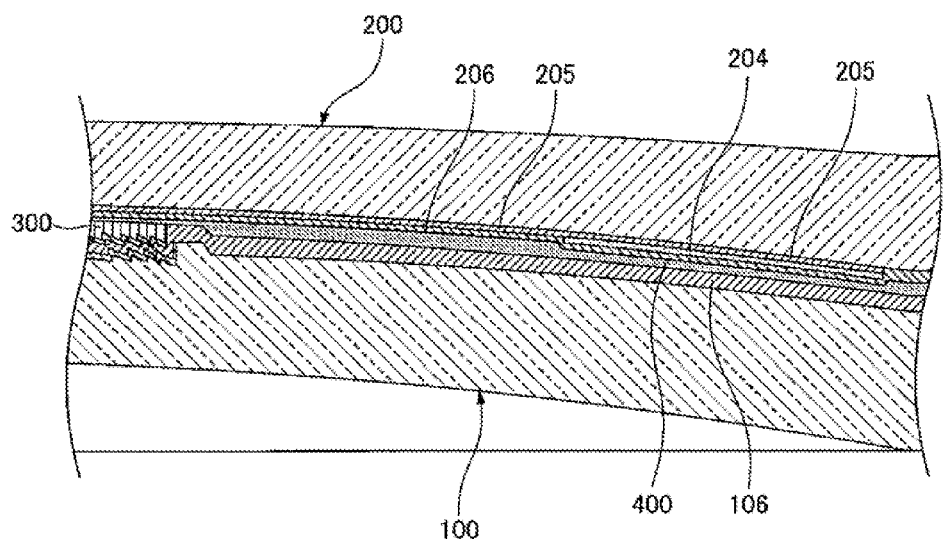
FIG. 25 is a sectional view in which the lens of the fourth embodiment is cut at a position on a second auxiliary electrode layer 204.

As shown in FIG. 23(c), the lower substrate 100 on which the first auxiliary electrode layer 104 is applied later to the lower electrode pattern 105 and the upper substrate 200 on which the second auxiliary electrode layer 204 is applied later to the upper electrode pattern 205 are bonded to each other with an adhesive layer 400 in a state in which a liquid crystal 300 is interposed between the lower substrate 100 and the upper substrate 200. FIG. 24 is an enlarged perspective view in which the bonded lower substrate 100 and upper substrate 200 are cut at a position on the first auxiliary electrode layer 104. FIG. 25 is an enlarged sectional view in which the bonded lower substrate 100 and upper substrate 200 are cut at a position on the upper electrode pattern 205.

Even in the case where the first and second auxiliary electrode layers 104 and 204 are applied later, as in the third embodiment, the end faces of the first auxiliary electrode layer 104 and the lower electrode pattern 105 of the lower substrate 100 are exposed on a lens end 302 of the lens 1 and the end faces of the second auxiliary electrode layer 204 and the upper electrode pattern 205 of the upper substrate 200 are exposed on the lens end 302 because the lower and upper substrates 100 and 200 are cut along a cutting line 301 as shown in FIG. 15. Other points are similar to those of the third embodiment.

The lower insulating pattern 106 and the upper insulating pattern 206 may be formed over the substrates. Therefore, the lower insulating pattern 106 and the upper insulating pattern 206 can be formed by sputtering without using a mask.

Fifth Embodiment

Figure 26:
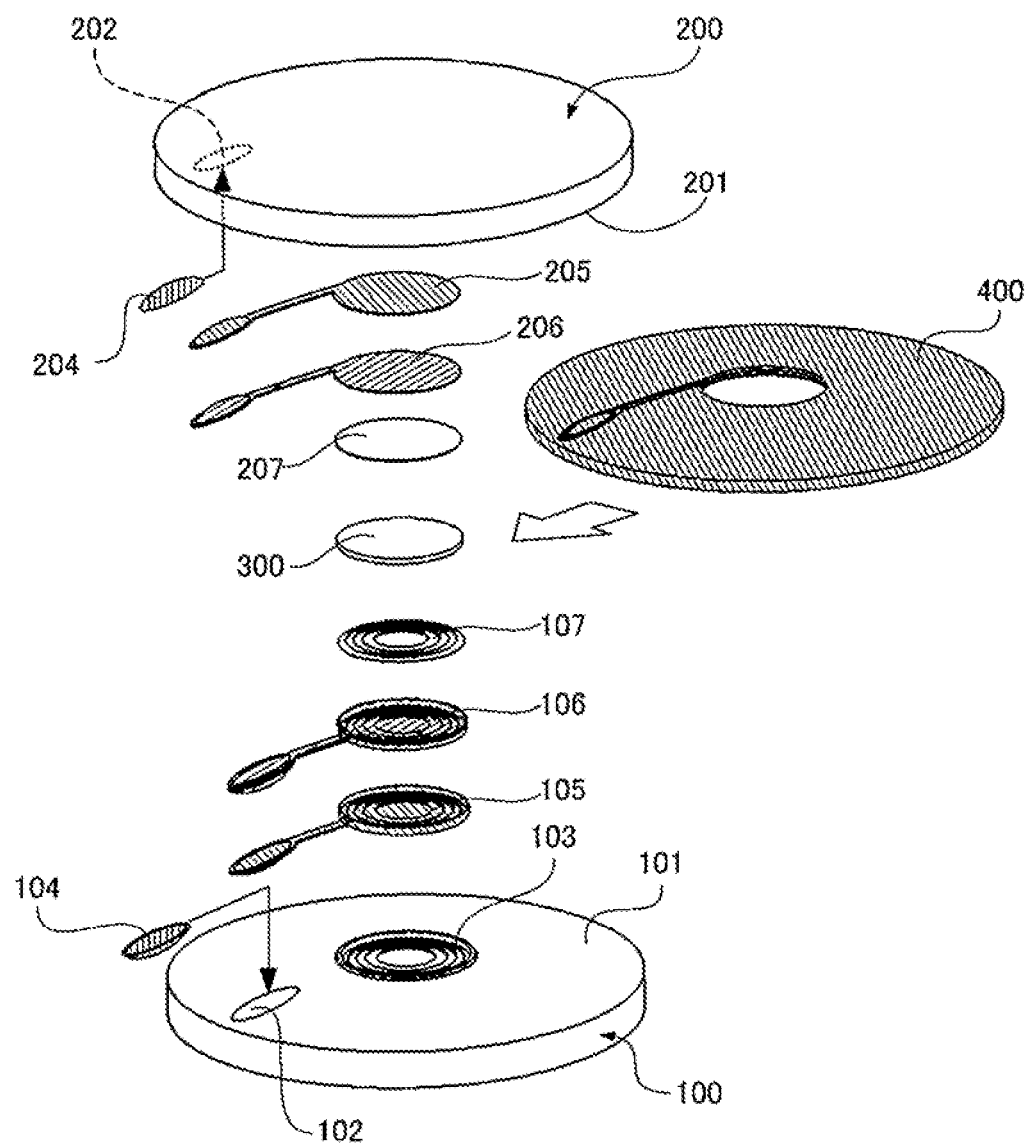
FIG. 26 is an exploded image of a completed lens 1 according to a fifth embodiment of the present invention.

In the third embodiment, the first auxiliary electrode layer 104 is formed on the smooth surface of the lower substrate 100 and the second auxiliary electrode layer 204 is formed on the smooth surface of the upper substrate 200, whereas in a fifth embodiment, as shown in FIG. 26, a first recess 102 is formed on a surface 101 of a lower substrate 100 and a second recess 202 is formed on a surface 201 of an upper substrate 200 such that first and second auxiliary electrode layers 104 and 204 can be correctly patterned at predetermined positions even when ITO ink having high wettability is used.

FIGS. 26 to 36 show a method for manufacturing a lens 1 for electronic spectacles.

FIG. 26 shows an exploded image of the completed lens 1 for better understanding of the manufacturing process. The lens 1 contains a liquid crystal 300 serving as an electric element between the lower substrate 100 and the upper substrate 200. Reference numeral 400 denotes an adhesive layer for joining the lower substrate 100 and the upper substrate 200.

Figure 27:
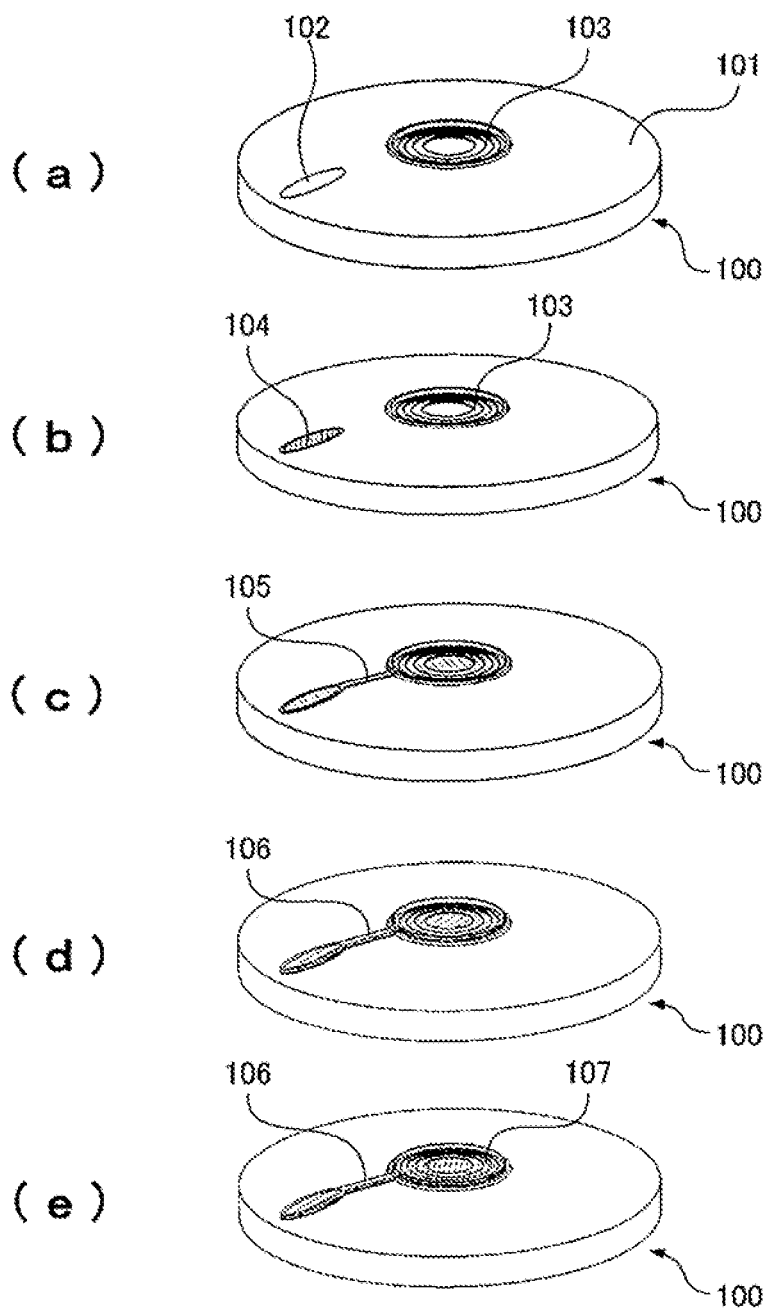
FIG. 27 is a perspective view showing a process of fabricating a lower substrate according to the fifth embodiment.
Figure 28:
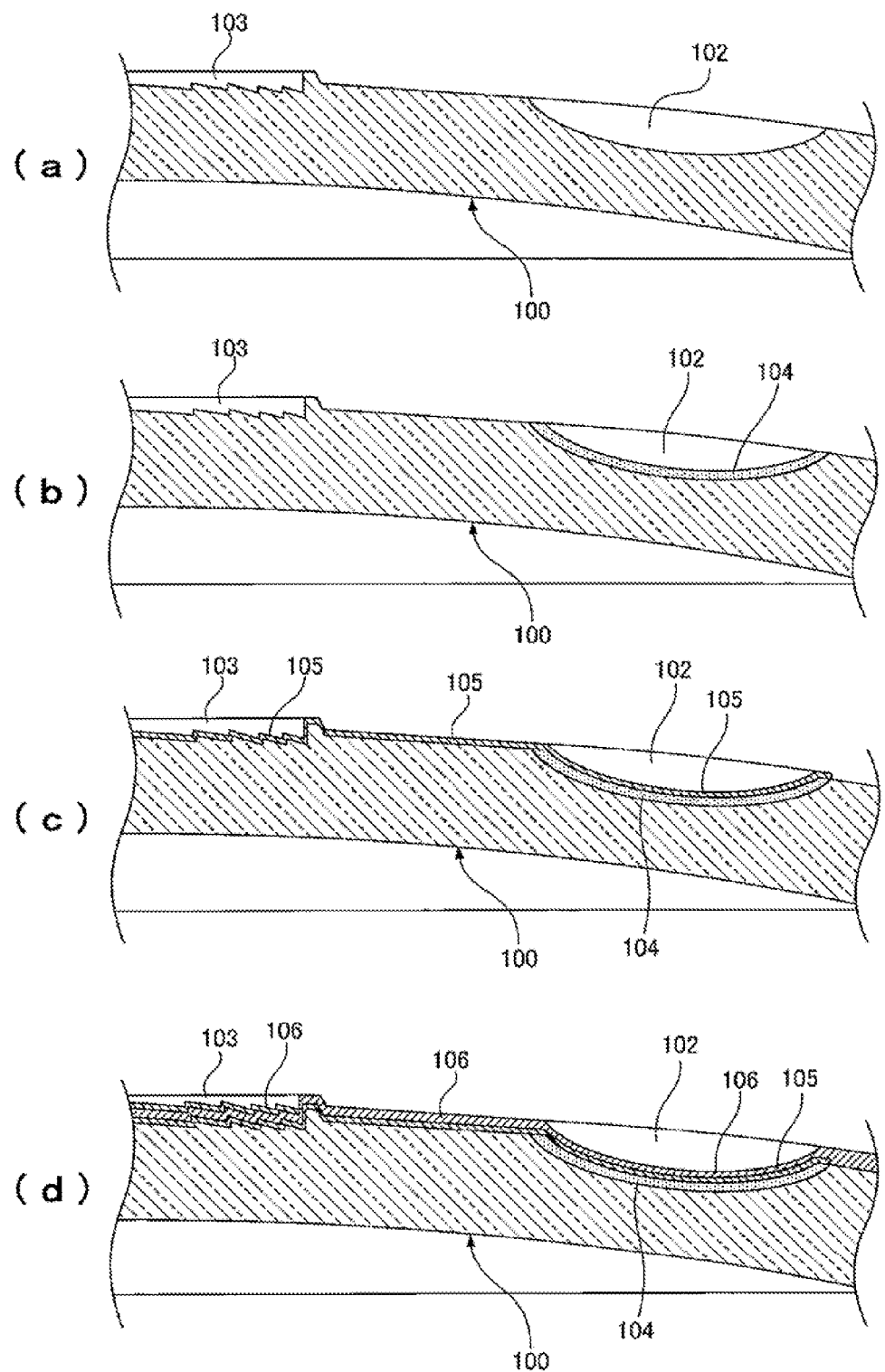
FIG. 28 is a sectional view showing the process of fabricating the lower substrate according to the fifth embodiment.

FIGS. 27 and 28 show a process for fabricating the lower substrate 100.

In FIG. 27(a), the first recess 102 and an electric element forming part 103 are formed on the surface 101 of the lower substrate 100 as shown in FIG. 28(a). The surface 101 is opposed to the upper substrate 200 and the liquid crystal 400 is placed on the electric element forming part 103 later. The first recess 102 is formed by transferring a convex formed on a resin molding die of the lower substrate 100. The first recess 102 can be formed after molding. The first recess 102 is preferably about 0.5 mm to 2 mm in width and about 10 mm to 20 mm in length. Further, the first recess 102 has a depth of about several tens μm to several hundreds μm.

In FIG. 27(b), the first recess 102 is coated with conductive ink to form the first auxiliary electrode layer 104 as shown in FIG. 28(b). The first auxiliary electrode layer 104 is preferably at least 1 μm in thickness. To be specific, the first recess 102 is filled with ITO ink that is conductive ink. The ITO ink may be applied by an ink-jet method or a dispenser. The surface of the first recess 102 formed on the surface 101 of the lower substrate 100 is coated with the ITO ink to form the first auxiliary electrode layer 104. Thus even when ITO ink having high wettability is used, it is possible to correctly pattern the first auxiliary electrode layer 104 at a predetermined position on the lower substrate 100.

The first auxiliary electrode layer 104 can be formed also by spin coating or dipping in a state in which a part other than the first recess 102 is masked with tape and the like.

In FIG. 27(c), a lower electrode pattern 105 is formed on the electric element forming part 103 and the first auxiliary electrode layer 104. The lower electrode pattern 105 connects the electric element forming part 103 and the first auxiliary electrode layer 104 so as to cover the first auxiliary electrode layer 104 as shown in FIG. 28(c). To be specific, ITO sputtering is performed using a mask pattern connecting the electric element forming part 103 and the first recess 102. The lower electrode pattern 105 is about 10 nm to 40 nm in thickness.

In FIG. 27(d), a lower insulating layer pattern 106 is formed on the electric element forming part 103 and the lower electrode pattern 105 as shown in FIG. 28(d). To be specific, after ITO sputtering in FIG. 27(c), $SiO_2$ is continuously sputtered without removing the lower substrate 100 from a chamber (without exposing the lower substrate 100 to the atmosphere). Such sputtering can be performed by a sputtering apparatus having multiple targets in a single chamber and thus a special apparatus is not necessary.

In FIG. 27(e), an alignment layer 107 is applied to a part to be coated with the liquid crystal 300, and rubbing is performed thereon.

Figure 29:
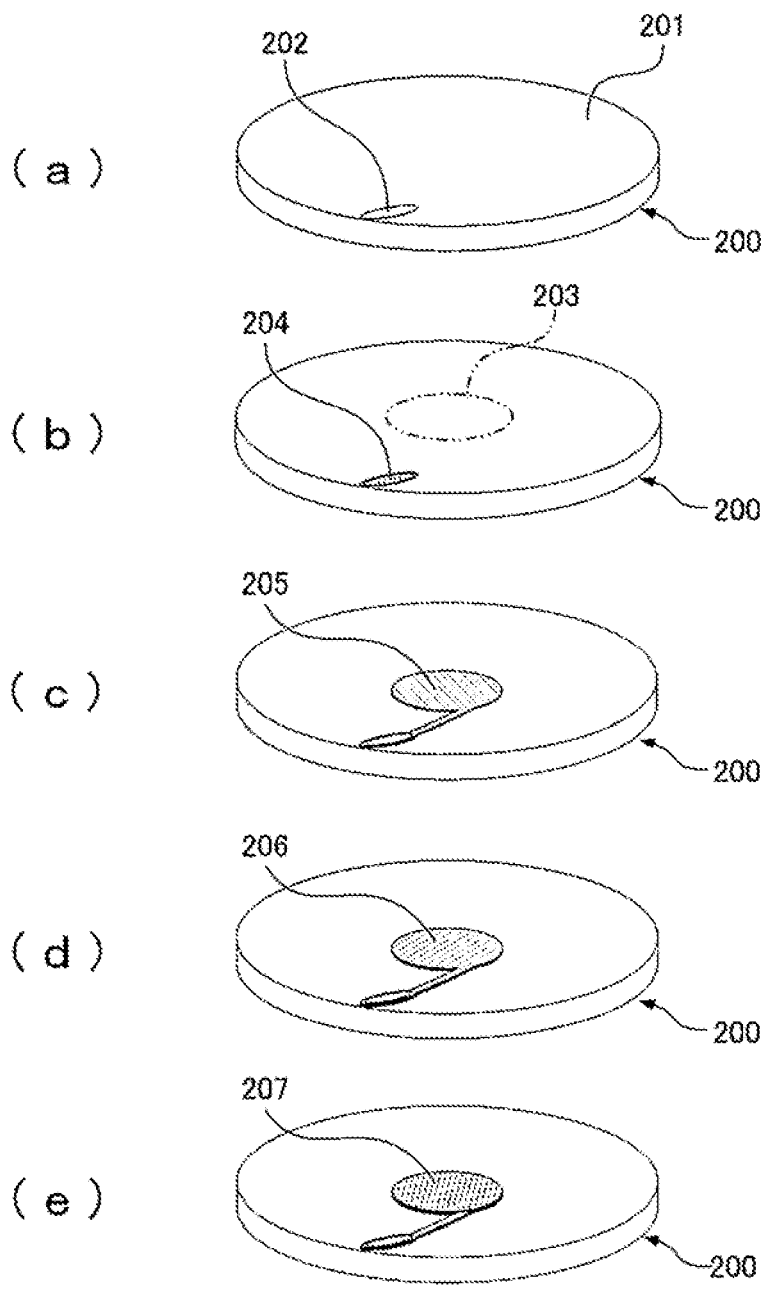
FIG. 29 is a perspective view showing a process of fabricating an upper substrate according to the fifth embodiment.
Figure 30:
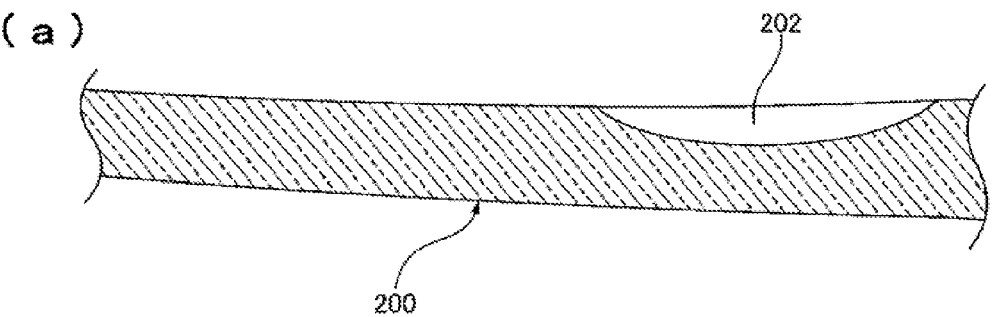
FIG. 30 is a sectional view showing the process of fabricating the upper substrate according to the fifth embodiment.
Figure 30:
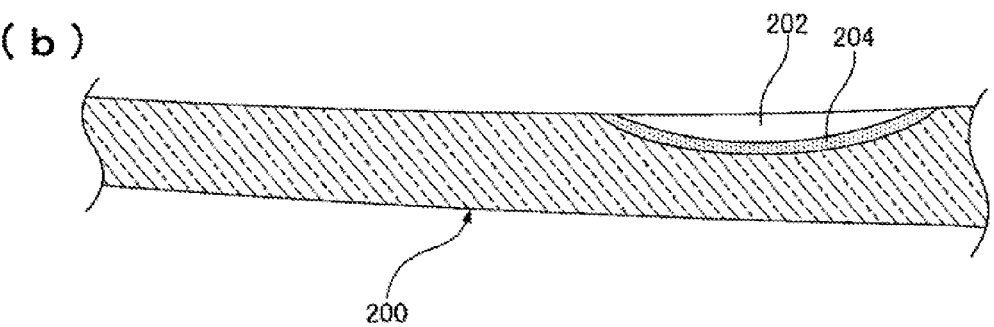
Figure 30:
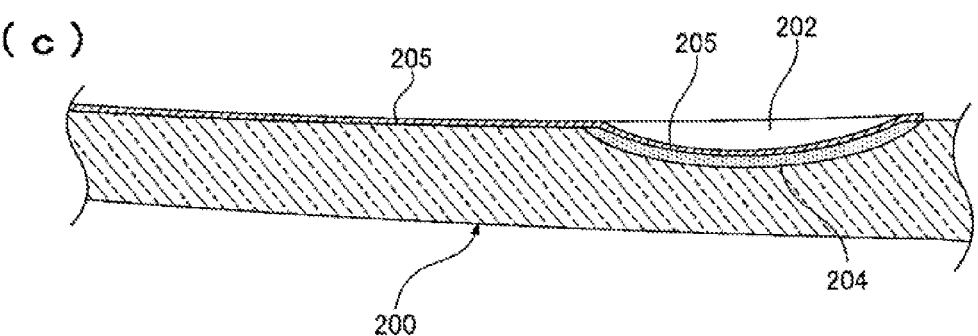
Figure 30:
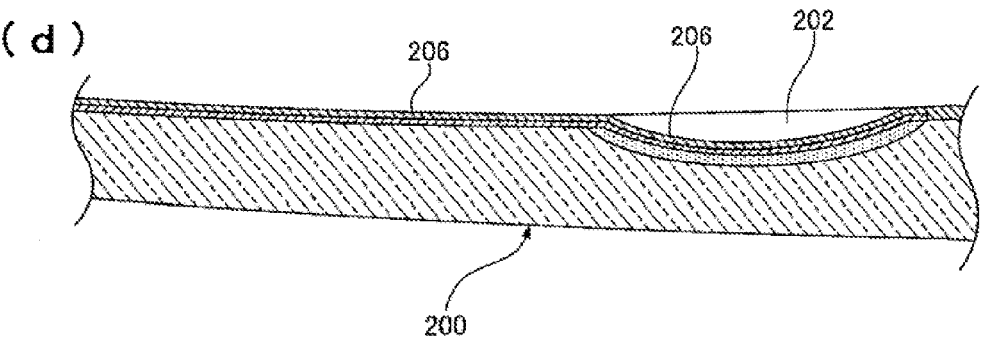

FIGS. 29 and 30 show a process for fabricating the upper substrate 200.

In FIG. 29(a), the second recess 202 is formed on the surface 201 of the upper substrate 200 as shown in FIG. 30(a). The surface 201 is opposed to the lower substrate 100. The second recess 202 is formed by transferring a convex formed on a resin molding die of the upper substrate 200. The second recess 202 can be formed after molding. The second recess 202 is preferably about 0.5 mm to 2 mm in width and about 10 mm to 20 mm in length. Further, the second recess 202 has a depth of about several tens μm to several hundreds μm.

In FIG. 29(b), the second recess 202 is coated with conductive ink to form the second auxiliary electrode layer 204 as shown in FIG. 30(b). The second auxiliary electrode layer 204 is preferably at least 1 μm in thickness. To be specific, the second recess 202 is filled with ITO ink that is conductive ink. The ITO ink may be applied by the ink-jet method or a dispenser. The surface of the second recess 202 formed on the surface 201 of the upper substrate 200 is coated with the ITO ink to form the second auxiliary electrode layer 204. Thus even when ITO ink having high wettability is used, it is possible to correctly pattern the second auxiliary electrode layer 204 at a predetermined position on the upper substrate 200.

The second auxiliary electrode layer 204 can be formed also by spin coating or dipping in a state in which a part other than the second recess 202 is masked with tape and the like.

In FIG. 29(c), an upper electrode pattern 205 is formed on a part 203 corresponding to the electric element forming part 103 on the lower substrate 100 and the second auxiliary electrode layer 204 as shown in FIG. 30(c). The upper electrode pattern 205 connects the part 203 and the second auxiliary electrode layer 204 so as to cover the second auxiliary electrode layer 204. To be specific, ITO sputtering is performed using a mask pattern connecting the part 203 and the second recess 202. The upper electrode pattern 205 is about 10 nm to 40 nm in thickness.

In FIG. 29(d), an upper insulating layer pattern 206 is formed on the upper electrode pattern 205 as shown in FIG. 30(d). To be specific, after ITO sputtering in FIG. 29(c), $SiO_2$ is continuously sputtered without removing the upper substrate 200 from a chamber device (without exposing the upper substrate 200 to the atmosphere). Such sputtering can be performed by a sputtering apparatus having multiple targets in a single chamber and thus a special apparatus is not necessary.

In FIG. 29(e), an alignment layer 207 is applied to a part of the upper electrode pattern 205 so as to correspond to the part 203, and rubbing is performed thereon.

The lower substrate 100 and the upper substrate 200 are bonded with the adhesive layer 400 in a state in which the liquid crystal 300 serving as the electric element is interposed between the electric element forming part 103 of the lower substrate 100 fabricated thus and the upper substrate 200. To be specific, the liquid crystal 300 is applied by a dispenser or the ink-jet method. After the liquid crystal 300 is applied, an adhesive (sealing agent) is applied around the liquid crystal 300 and then the lower substrate 100 and the upper substrate 200 are bonded with the adhesive layer 400.

Figure 31:
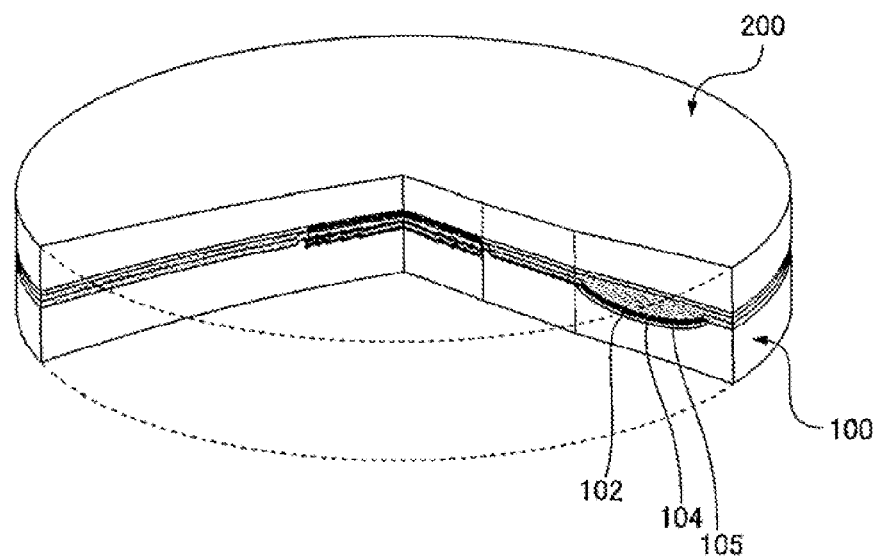
FIG. 31 is an enlarged perspective view in which a lens of the fifth embodiment is cut at a position on a first recess 102.
Figure 32:
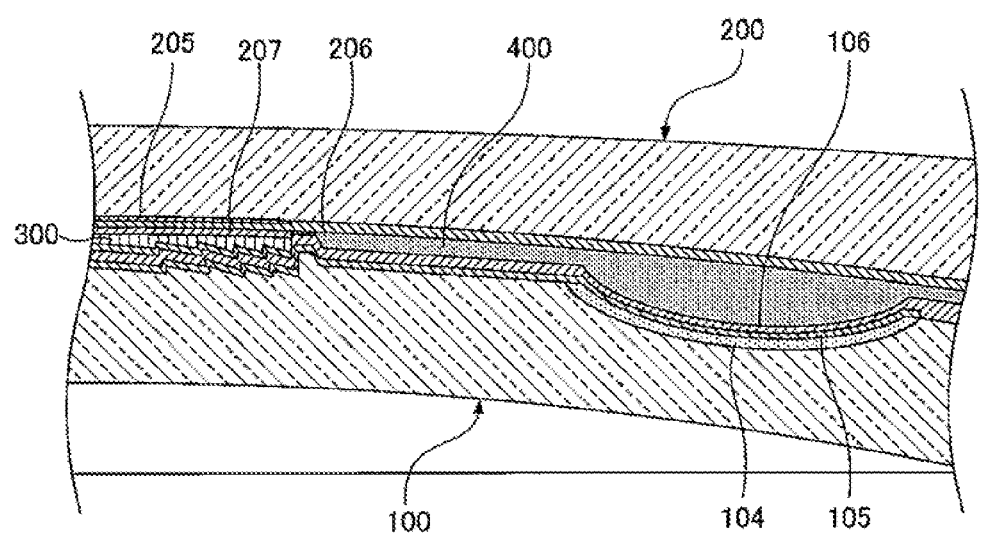
FIG. 32 is a sectional view in which the lens of the fifth embodiment is cut at the position on the first recess 102.
Figure 33:
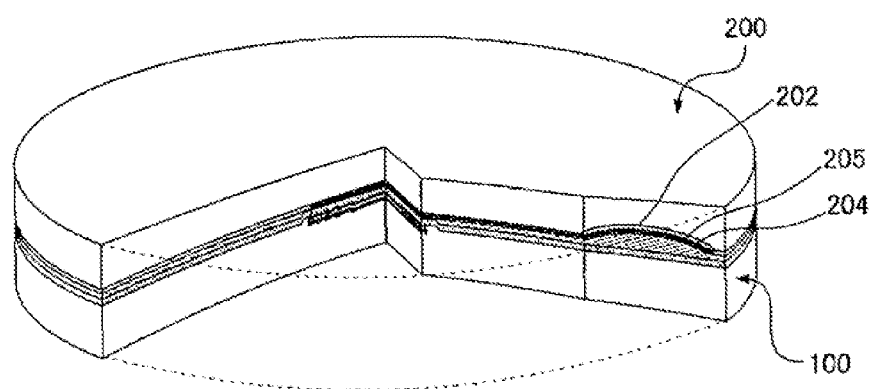
FIG. 33 is an enlarged perspective view in which the lens of the fifth embodiment is cut at a position on a second recess 202.
Figure 34:
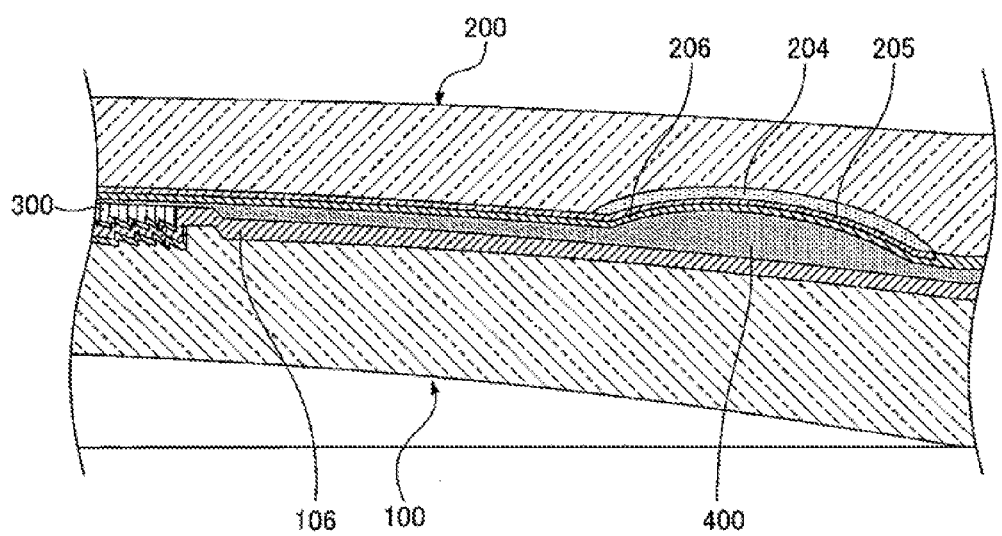
FIG. 34 is a sectional view in which the lens of the fifth embodiment is cut at the position on the second recess 202.

FIG. 31 is an enlarged perspective view in which the bonded lower substrate 100 and upper substrate 200 are cut at a position on the first recess 102. FIG. 32 is an enlarged view of the principle part of FIG. 31. FIG. 33 is an enlarged perspective view in which the bonded lower substrate 100 and upper substrate 200 are cut at a position on the second recess 202. FIG. 34 is an enlarged view of the principle part of FIG. 33.

Figure 35:
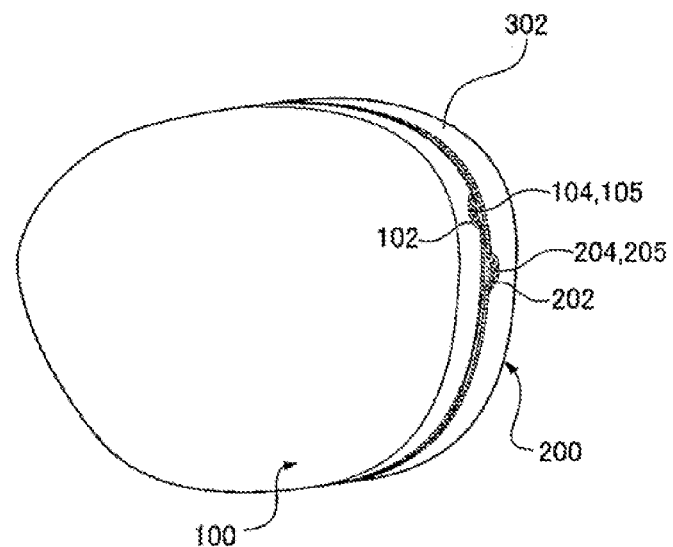
FIG. 35 is a plan view showing the cutting position of the lens according to the fifth embodiment.
Figure 36:
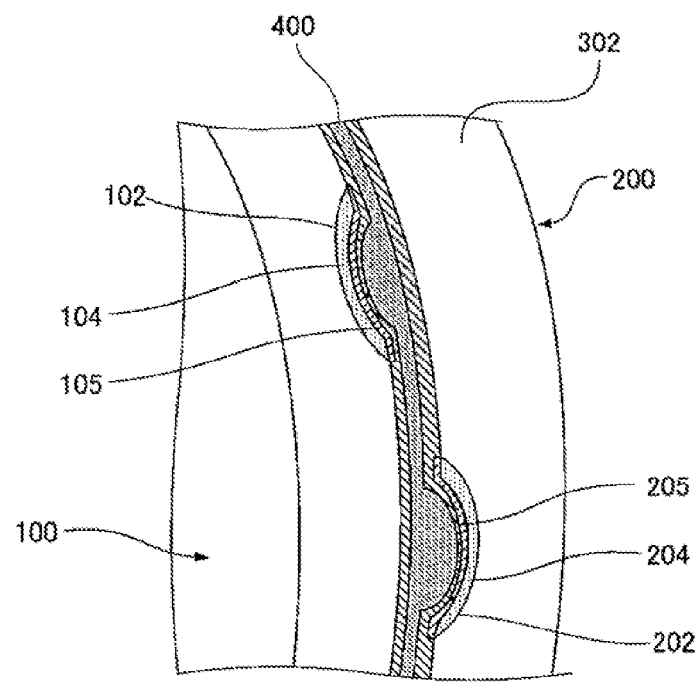
FIG. 36 is an enlarged perspective view showing a lens end face of the cut lens according to the fifth embodiment.

As in FIG. 15, the lower substrate 100 and the upper substrate 200 that have been bonded thus are cut along a cutting line 301 according to the shape of a rim 8 of a spectacle frame 11. In this case, the substrates 100 and 200 are cut at the first and second recesses 102 and 202 and the cut surfaces of the first and second recesses 102 and 202 are exposed on a lens end 302 as shown in FIG. 35. As shown in FIG. 36, on the exposed cut surfaces of the first and second recesses 102 and 202, the end faces of the first auxiliary electrode layer 104 and the lower electrode pattern 105 of the lower substrate 100 are exposed and the end faces of the second auxiliary electrode layer 204 and the upper electrode pattern 205 of the upper substrate 200 are exposed.

As shown in FIGS. 18 and 19, the electronic spectacles can be constructed using the lens of FIG. 35. The lenses 1 are set in the spectacle frame 11.

With this configuration, a voltage for driving the liquid crystal 300 can be applied between the lower electrode pattern 105 and the upper electrode pattern 205 of the lens 1 from the control unit 5.

In the case where the first and second recesses 102 and 202 are coated with the first and second auxiliary electrode layers 104 and 204 and then the lower electrode pattern 105 and the upper electrode pattern 205 are formed thereon, the lower insulating layer pattern 106 and the upper insulating layer pattern 206 can be formed, as previously mentioned, on the lower electrode pattern 105 and the upper electrode pattern 205 by continuous sputtering without removing the lower substrate 100 and the upper substrate 200 from the chamber opened to the atmosphere.

To be specific, in the case where the lower electrode pattern 105 and the upper electrode pattern 205 are formed on the first and second recesses 102 and 202 and then the lower electrode pattern 105 and the upper electrode pattern 205 are coated with the first and second auxiliary electrode layers 104 and 204, the lower electrode pattern 105 and the upper electrode pattern 205 are formed on the first and second recesses 102 and 202 by sputtering, the sputtering apparatus is opened to the atmosphere to remove the lower substrate 100 and the upper substrate 200, the mask pattern is changed, and then the lower insulating layer pattern 106 and the upper insulating layer pattern 206 are formed. In another method, the lower electrode pattern 105 and the upper electrode pattern 205 are formed on the first and second recesses 102 and 202 by sputtering, the sputtering apparatus is opened to the atmosphere to remove the lower substrate 100 and the upper substrate 200, the first and second auxiliary electrodes 104 and 204 are formed, and then sputtering is performed again. In both of the methods, however, vapor drawing performed twice in the sputtering apparatus results in a complicated fabrication process.

In the present embodiment, the first and second auxiliary electrode layers 104 and 204 are first applied. In this case, the lower electrode pattern 105 and the lower insulating layer pattern 106 can be formed on the lower substrate 100 without opening the sputtering apparatus to the atmosphere, and the upper electrode pattern 205 and the upper insulating layer pattern 206 can be formed on the upper substrate 200 without opening the sputtering apparatus to the atmosphere, thereby achieving a simple fabrication process.

As in FIGS. 20 and 21, it is more preferable to apply silver pastes 303a and 303b that are conductive pastes onto the first auxiliary electrode layer 104 and the second auxiliary electrode layer 204 because the silver pastes 303a and 303b increase the contact areas. The same advantage can be achieved as in the foregoing embodiments.

Sixth Embodiment

Figure 37:
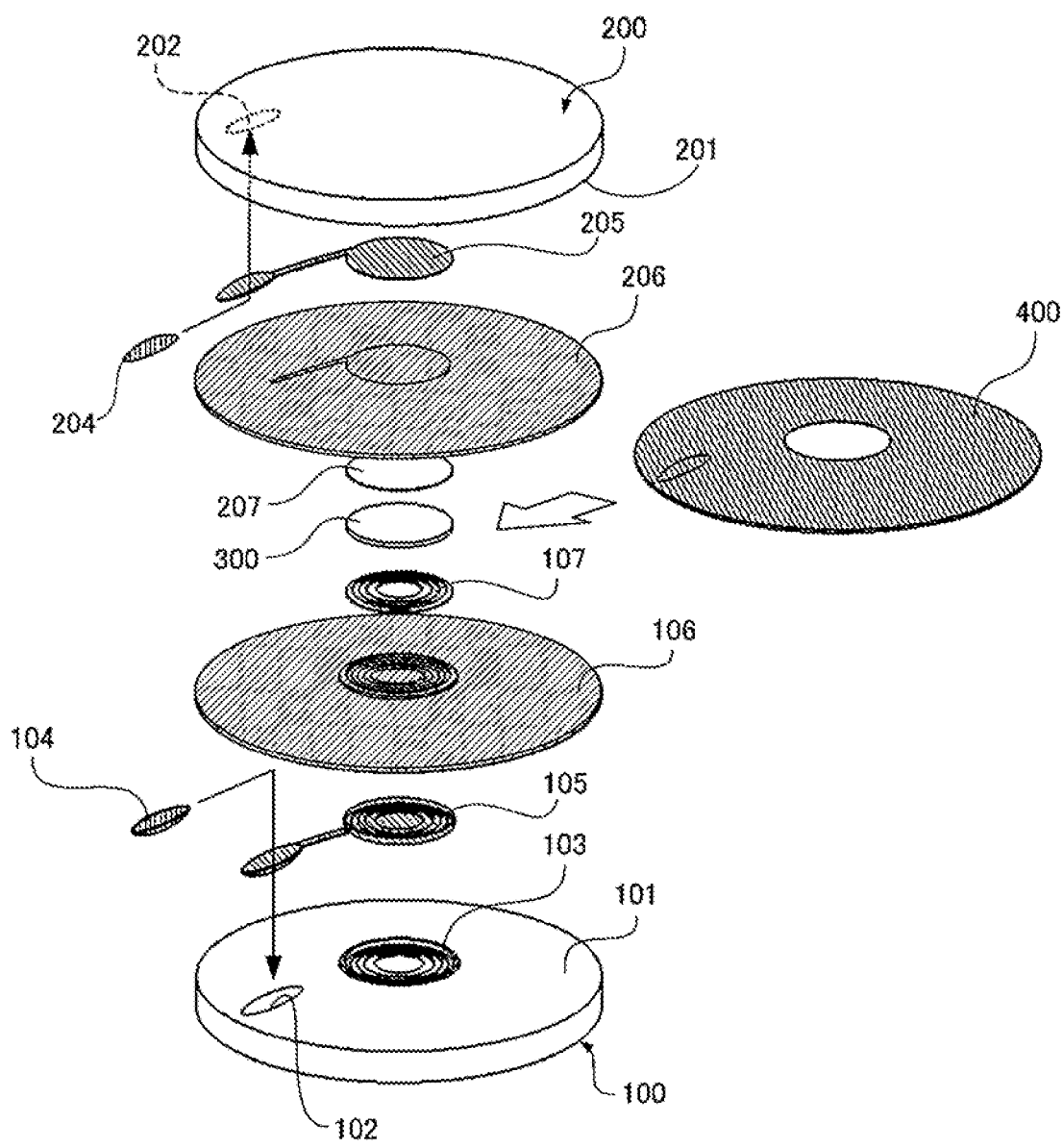
FIG. 37 is an exploded image of a completed lens 1 according to a sixth embodiment of the present invention.
Figure 38:
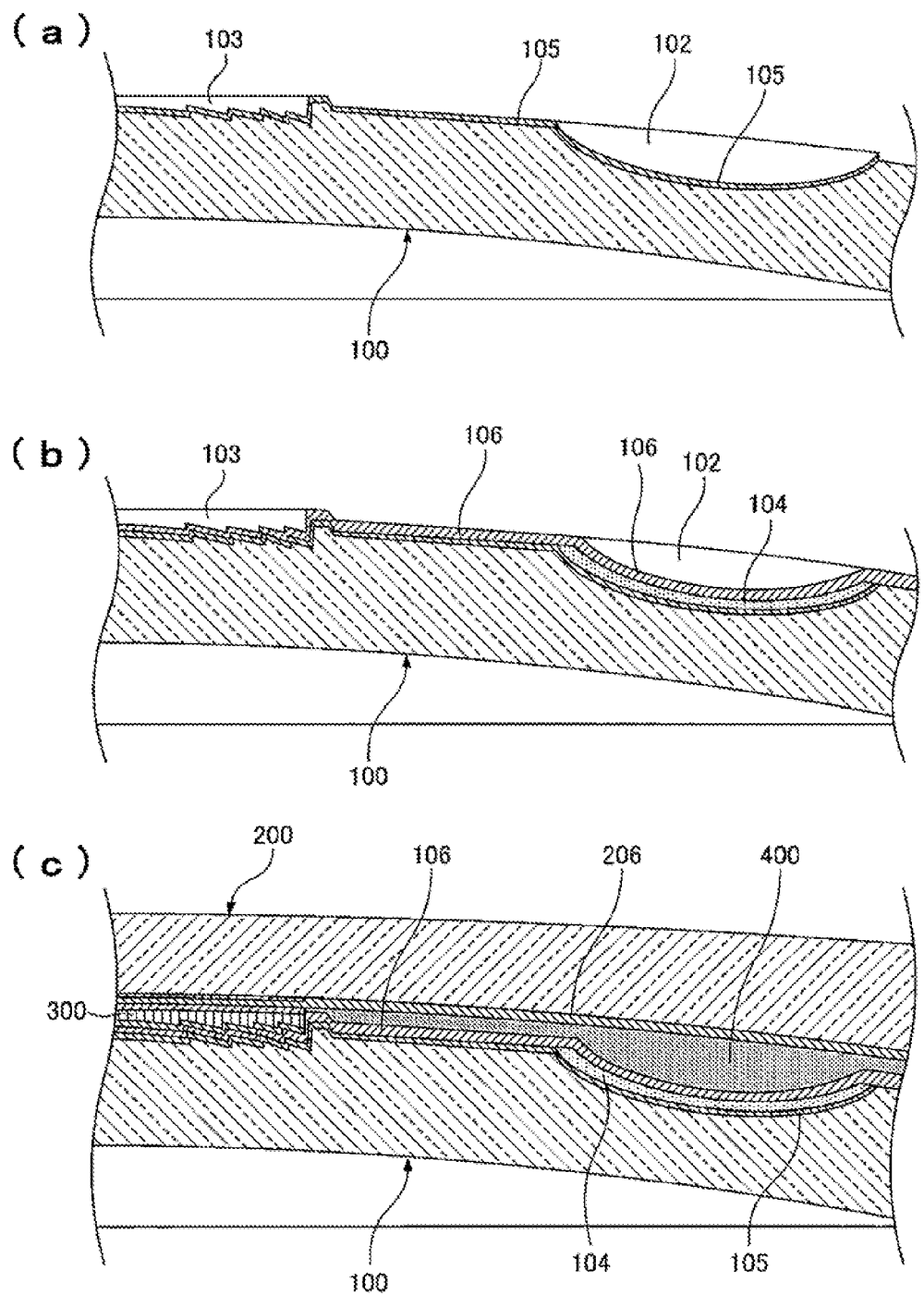
FIG. 38 is a sectional view showing a process of fabricating a lower substrate according to the sixth embodiment.

In the fourth embodiment, the first auxiliary electrode layer 104 is formed on the smooth surface of the lower substrate 100 and the second auxiliary electrode layer 204 is formed on the smooth surface of the upper substrate 200, whereas in a sixth embodiment, as shown in FIG. 37, a first recess 102 is formed on a surface 101 of a lower substrate 100 and a second recess 202 is formed on a surface 201 of an upper substrate 200 such that first and second auxiliary electrode layers 104 and 204 can be correctly patterned at predetermined positions even when ITO ink having high wettability is used.

FIGS. 37 to 40 show the sixth embodiment of the present invention.

In the fifth embodiment, the first recess 102 is coated with the first auxiliary electrode layer 104 and then the lower electrode pattern 105 is formed thereon, and the second recess 202 is coated with the second auxiliary electrode layer 204 and then the upper electrode pattern 205 is formed thereon. The sixth embodiment is different only in that the first and second auxiliary electrode layers 104 and 204 are applied later. Other points are similar to those of the fifth embodiment.

FIG. 37 shows an exploded image of a completed lens 1 for better understanding of the manufacturing process.

In FIG. 38(a), a lower electrode pattern 105 is formed from an electric element forming part 103 to the first recess 102 of the lower substrate 100.

In FIG. 38(b), the lower electrode pattern 105 is coated with conductive ink only in the first recess 102 to form the first auxiliary electrode layer 104, and a lower insulating layer pattern 106 is formed so as to cover the first auxiliary electrode layer 104, the lower electrode pattern 105, and the electric element forming part 103. As shown in FIG. 37, an alignment layer 107 is formed on the lower insulating layer pattern 106 so as to correspond to the position of the electric element forming part 103.

In this case, the upper substrate 200 is formed as in FIGS. 38(a) and 38(b). In other words, as shown in FIG. 37, an upper electrode pattern 205 is formed on a part corresponding to the electric element forming part 103 on the lower substrate 100, the second recess 202, and a part connecting the electric element forming part 103 and the second recess 202. After that, the upper electrode pattern 205 is coated with conductive ink only in the second recess 202 to form the second auxiliary electrode layer 204. Further, an upper insulating layer pattern 206 is formed so as to cover the second auxiliary electrode layer 204 and the upper electrode pattern 205. Moreover, an alignment layer 207 is formed thereon.

Figure 39:
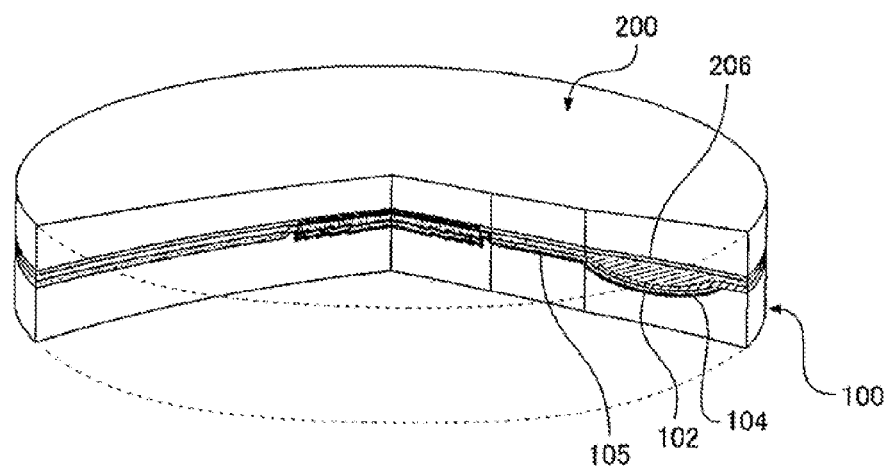
FIG. 39 is an enlarged perspective view in which a lens of the sixth embodiment is cut at a position on a first recess 102.
Figure 40:
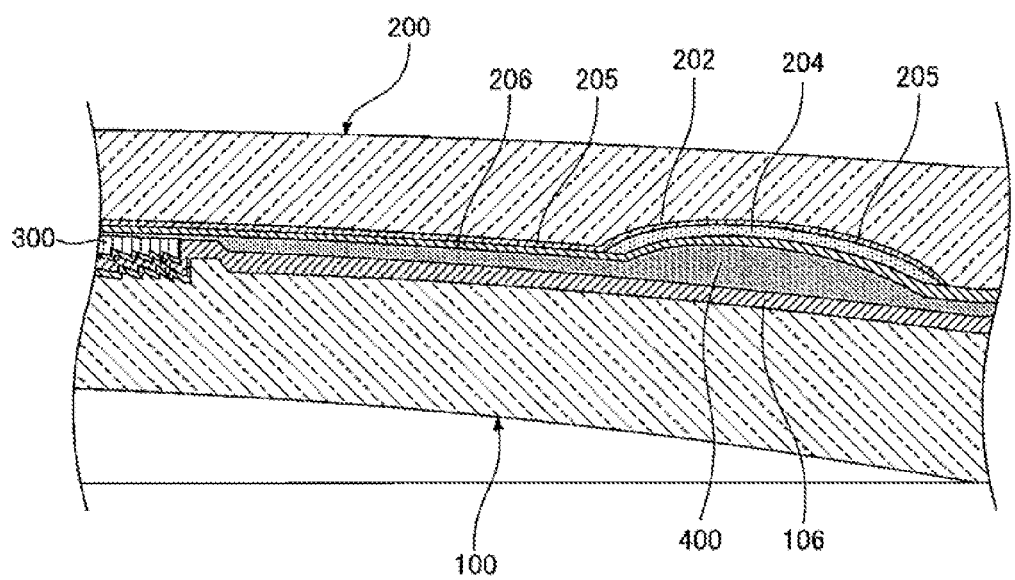
FIG. 40 is a sectional view in which the lens of the sixth embodiment is cut at a position on a second recess 202.

As shown in FIG. 38(c), the lower substrate 100 on which the first auxiliary electrode layer 104 is applied later onto the lower electrode pattern 105 in the first recess 102 and the upper substrate 200 on which the second auxiliary electrode layer 204 is applied later onto the upper electrode pattern 205 in the second recess 202 are bonded to each other with an adhesive layer 400 in a state in which a liquid crystal 300 is interposed between the lower substrate 100 and the upper substrate 200. FIG. 39 is an enlarged perspective view in which the bonded lower substrate 100 and upper substrate 200 are cut at a position on the first recess 102. FIG. 40 is an enlarged sectional view in which the bonded lower substrate 100 and upper substrate 200 are cut at a position on the second recess 202.

Even when the first and second auxiliary electrode layers 104 and 204 are applied later onto the first and second recesses 102 and 202, as in the fifth embodiment, the end faces of the first auxiliary electrode layer 104 and the lower electrode pattern 105 of the lower substrate 100 are exposed on a lens end 302 of the lens 1 and the end faces of the second auxiliary electrode layer 204 and the upper electrode pattern 205 of the upper substrate 200 are exposed on the lens end 302 because the lower and upper substrates 100 and 200 are cut along the cutting line 301 as in FIG. 35. Other points are similar to those of the fifth embodiment.

In the sixth embodiment, the first auxiliary electrode layer 104 is formed on the recess of the lower electrode pattern 105 in the first recess 102 and the second auxiliary electrode layer 204 is formed on the recess of the upper electrode pattern 205 in the second recess 202. Thus even when ITO ink having high wettability is used, it is possible to correctly pattern the first and second auxiliary electrode layers 104 and 204 at predetermined positions on the lower substrate 100 and the upper substrate 200.

Further, the lower insulating pattern 106 and the upper insulating pattern 206 may be formed over the substrates, thereby forming insulating layers by sputtering without using a mask.

Seventh Embodiment

Figure 41:
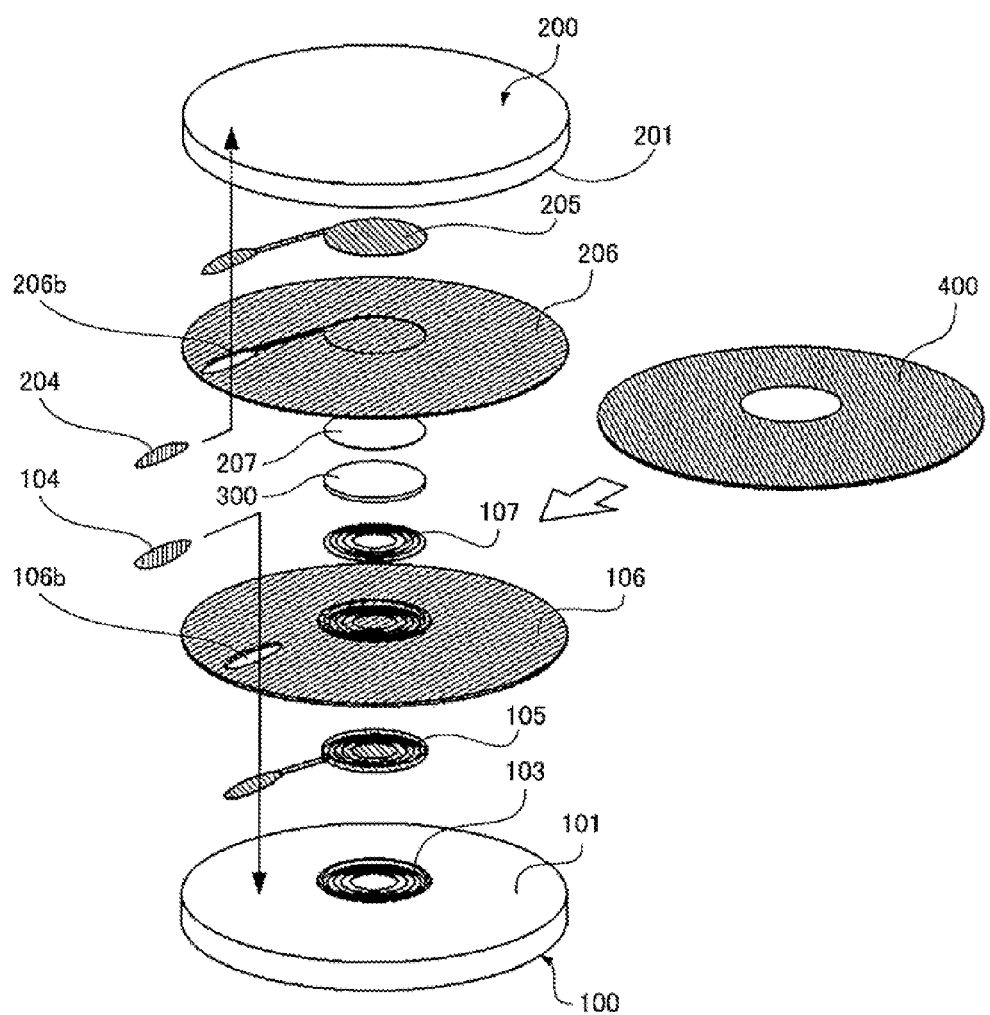
FIG. 41 is an exploded image of a completed lens 1 according to a seventh embodiment of the present invention.

In the fourth embodiment, the first auxiliary electrode layer 104 is formed on the lower substrate 100 and then the lower insulating layer pattern 106 is formed thereon, and the second auxiliary electrode layer 204 is formed on the upper substrate 200 and then the upper insulating layer pattern 206 is formed thereon. A seventh embodiment is different only in that a hole 106b (see FIG. 41) is formed on a lower insulating layer pattern 106, a hole 206b (see FIG. 41) is formed on an upper insulating layer pattern 206, the lower insulating layer pattern 106 is formed before a first auxiliary electrode layer 104, and the upper insulating layer pattern 206 is formed before a second auxiliary electrode layer 204.

In the seventh embodiment, the hole 106b of the lower insulating layer pattern 106 formed on a lower electrode pattern 105 is filled with conductive ink and the lower electrode pattern 105 is partially coated with the conductive ink. Thus even when ITO ink having high wettability is used, it is possible to correctly pattern the first auxiliary electrode layer 104 at a predetermined position. Similarly, the hole 206b of the upper insulating layer pattern 206 formed on an upper electrode pattern 205 is filled with conductive ink and the upper electrode pattern 205 is partially coated with the conductive ink. Thus even when ITO ink having high wettability is used, it is possible to correctly pattern the second auxiliary electrode layer 204 at a predetermined position. Other points are similar to those of the fourth embodiment.

Eighth Embodiment

Figure 42:
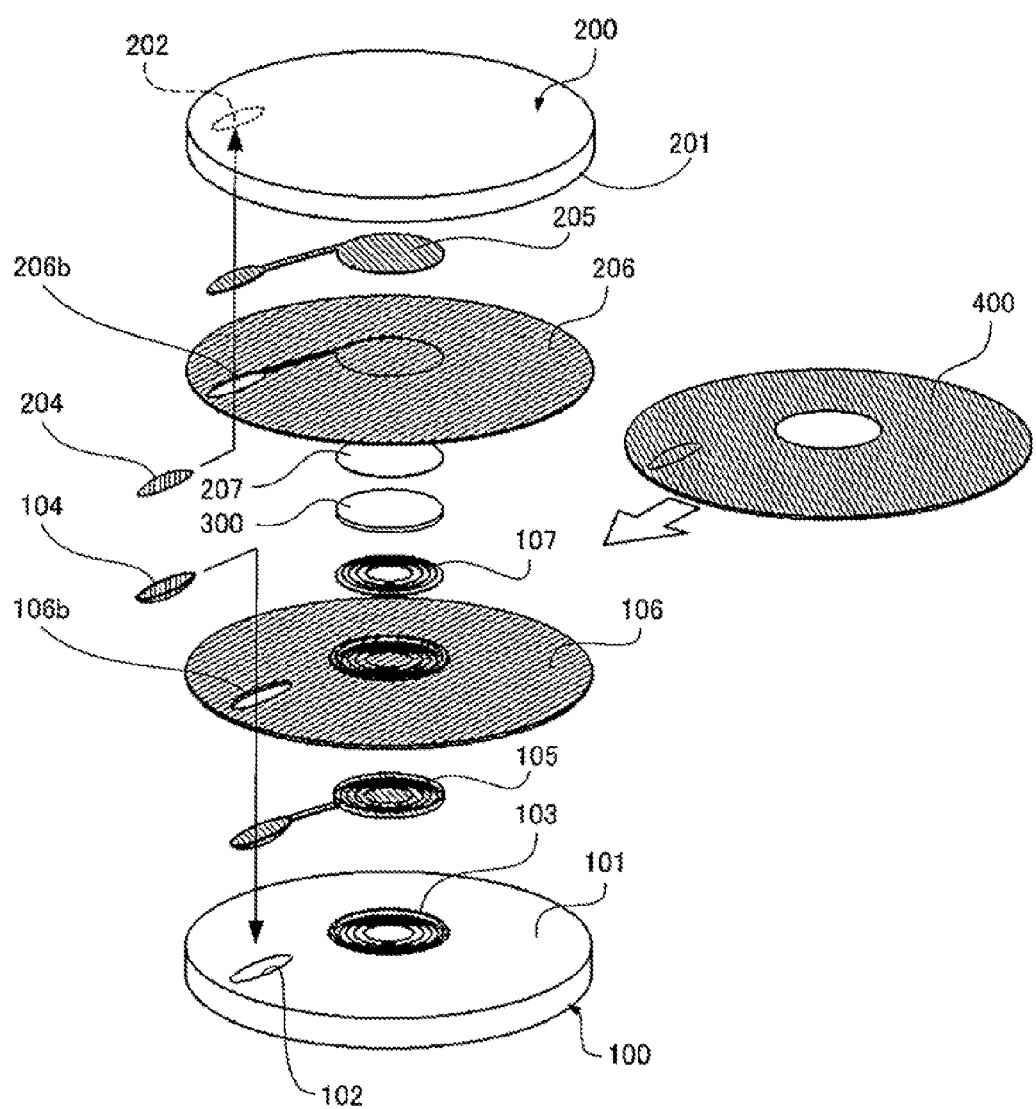
FIG. 42 is an exploded image of a completed lens 1 according to an eighth embodiment of the present invention.
Figure 43:
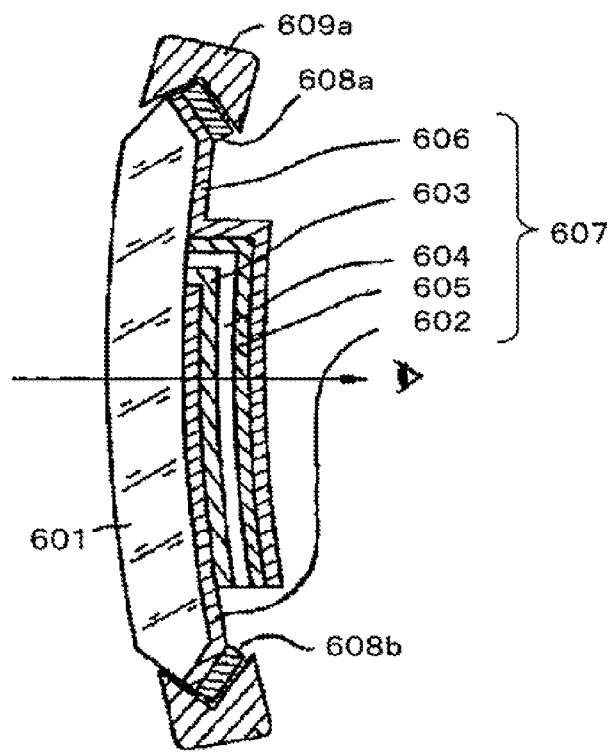
FIG. 43 shows electronic spectacles of the prior art.
Figure 44:
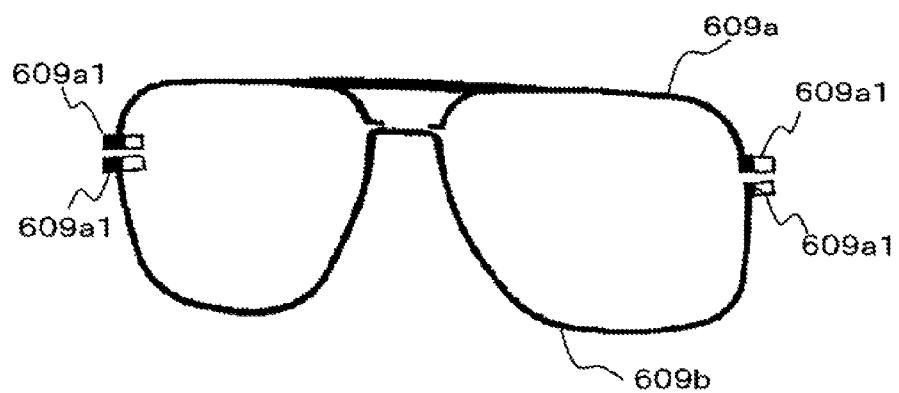
FIG. 44 shows the electronic spectacles of the prior art.

In the sixth embodiment, the first auxiliary electrode layer 104 is formed on the lower substrate 100 and then the lower insulating layer pattern 106 is formed thereon, and the second auxiliary electrode layer 204 is formed on the upper substrate 200 and then the upper insulating layer pattern 206 is formed thereon. An eighth embodiment is different only in that a hole 106b (see FIG. 42) is formed on a lower insulating layer pattern 106, a hole 206b (see FIG. 42) is formed on an upper insulating layer pattern 206, the lower insulating layer pattern 106 is formed before a first auxiliary electrode layer 104, and the upper insulating layer pattern 206 is formed before a second auxiliary electrode layer 204.

In the eighth embodiment, the hole 106b of the lower insulating layer pattern 106 formed on a lower electrode pattern 105 is filled with conductive ink and the lower electrode pattern 105 is partially coated with the conductive ink. Thus even when ITO ink having high wettability is used, it is possible to correctly pattern the first auxiliary electrode layer 104 at a predetermined position. Similarly, the hole 206b of the upper insulating layer pattern 206 formed on an upper electrode pattern 205 is filled with conductive ink and the upper electrode pattern 205 is partially coated with the conductive ink. Thus even when ITO ink having high wettability is used, it is possible to correctly pattern the second auxiliary electrode layer 204 at a predetermined position. Other points are similar to those of the sixth embodiment.

In the fifth, sixth, and eighth embodiments, the first and second recesses 102 and 202 make it possible to correctly pattern highly wettable ink at the predetermined positions and prevent the ITO ink, which is conductive ink, from spreading to the bonded surfaces of the upper and lower substrates.

In the case where patterning is performed directly on the surfaces of the lower substrate 100 and the upper substrate 200 without providing the first and second recesses 102 and 202 as in the third, fourth, and seventh embodiments, a gap is formed between the bonded upper and lower substrates because of the thickness of the ITO ink that is conductive ink, thereby deforming the lens 1. The fifth, sixth, and eighth embodiments make it possible to satisfactorily fabricate the lens 1 with less deformation.

In the fifth, sixth, and eighth embodiments, when the first and second recesses 102 and 202 are composed of flat surfaces in cross section, ink tends to gather at straight lines where the surfaces of the recess intersect with each other, so that the ink has a larger thickness in some portions than on the flat surfaces. In the portions where a liquid tends to gather, cracks are likely to occur owing to different dry states on the surface of an ITO ink film that is a conductive ink film, thereby increasing the resistance of a transparent conductive film formed of ITO ink. In order to solve this problem, the first and second recesses 102 and 202 of the fifth, sixth, and eighth embodiments are curved in cross section. When the first and second recesses 102 and 202 are not curved in cross section but are formed by joining flat surfaces in cross section, substantially the same effect can be expected by rounding the intersections of the flat surfaces.

In the third to eighth embodiments, the transparent first and second auxiliary electrode layers 104 and 204 are formed by applying ITO ink that is conductive ink and the transparent lower electrode pattern 105 and upper electrode pattern 205 are formed by sputtering. The lower electrode pattern 105 and the upper electrode pattern 205 can be similarly formed by vapor deposition methods other than sputtering. The other vapor deposition methods include PVD (Physical Vapor Deposition) methods such as resistance heating vapor deposition, electron beam vapor deposition, molecular beam epitaxy, ion plating and ion beam deposition, and chemical vapor deposition methods, thermal CVD (thermal Chemical Vapor Deposition), plasma CVD (plasma-enhanced chemical vapor deposition), optical CVD, epitaxial CVD, and atomic layer CVD.

Further, the transparent first and second auxiliary electrode layers 104 and 204, the lower electrode pattern 105, and the upper electrode pattern 205 are made of ITO (indium tin oxide) in the example of the foregoing explanation. The layers and patterns may be made of ITO substitute transparent electrode materials that include niobium-doped titanium dioxide ($Ti_{1-x}Nb_xO_2$: TNO) not containing indium but containing titanium as a major component, and ZnO.

In the third to eighth embodiments, the lower insulating layer pattern 106 and the upper insulating layer pattern 206 are provided. When the lower electrode pattern 105 and the upper electrode pattern 205 can be electrically insulated in a continuous manner by the adhesive layer 400 alone, at least one of the lower insulating layer pattern 106 and the upper insulating layer pattern 206 may be omitted.

INDUSTRIAL APPLICABILITY

Electronic spectacles according to the present invention ensure connection to an electric circuit and achieve higher reliability. Thus the present invention is useful for spectacles and sunglasses that use electric elements such as a liquid crystal element and an electrochromic element.

The invention claimed is:

1. Electronic spectacles in which a lens comprising an electric element is set in a rim of a spectacle frame,
   the lens having lens electrode pads exposed on a lens end, the lens electrode pads applying a voltage to the electric element,
   an electric connector having a first end connected to a control unit for controlling the electric element and second end extended to an inside of the rim of the spectacle frame passing through between rim locks, the rim being opposed to the lens electrode pads.

2. The electronic spectacles according to claim 1, wherein the second end of the electric connector provided at the inside of the rim is placed in a groove of the rim or a spot facing.

3. The electronic spectacles according to claim 1, wherein wiring electrode pads are set on the second end of the electric connector provided at the inside of the rim.

4. The electronic spectacles according to claim 3, wherein a rubber member is interposed between the wiring electrode pads of the electric connector and the lens electrode pads of the lens.

5. The electronic spectacles according to claim 4, wherein the rubber member is a conductive rubber.

6. The electronic spectacles according to claim 5, wherein the conductive rubber is an anisotropic conductive rubber.

7. Electronic spectacles in which a lens comprising an electric element is set in a rim of a spectacle frame,
   the lens having lens electrode pads exposed on a lens ends, the lens electrode pads applying a voltage to the electric element,
   an electric connector having a first end connected to a control unit for controlling the electric element and a second end provided at an inside of the rim passing through between rim locks of the spectacle frame, the rim being opposed to the lens electrode pads,
   wherein the electric connector is set between the rim locks by an aligner.

8. The electronic spectacles according to claim 7, wherein the aligner is a screw for defining the distance between the rim locks.

* * * * *